United States Patent
Kumar et al.

(10) Patent No.: US 10,701,669 B2
(45) Date of Patent: Jun. 30, 2020

(54) CARRIER SELECTION FOR POSITION MEASUREMENT

(71) Applicant: QUALCOMM Incorporated, San Diego, CA (US)

(72) Inventors: Akash Kumar, Hyderabad (IN); Amit Jain, San Diego, CA (US); Ankita, Hyderabad (IN)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/387,060

(22) Filed: Apr. 17, 2019

(65) Prior Publication Data

US 2019/0274119 A1   Sep. 5, 2019

Related U.S. Application Data

(63) Continuation of application No. 15/712,585, filed on Sep. 22, 2017, now Pat. No. 10,314,012.

(51) Int. Cl.
| | |
|---|---|
| *H04W 72/02* | (2009.01) |
| *H04W 72/00* | (2009.01) |
| *H04W 48/16* | (2009.01) |
| *H04W 64/00* | (2009.01) |
| *H04W 72/06* | (2009.01) |
| *H04W 72/08* | (2009.01) |
| *H04W 36/06* | (2009.01) |
| *H04W 48/18* | (2009.01) |

(52) U.S. Cl.
CPC .......... *H04W 72/02* (2013.01); *H04W 48/16* (2013.01); *H04W 64/003* (2013.01); *H04W 72/00* (2013.01); *H04W 72/06* (2013.01); *H04W 72/08* (2013.01); *H04W 36/06* (2013.01); *H04W 48/18* (2013.01)

(58) Field of Classification Search
CPC combination set(s) only.
See application file for complete search history.

(56) References Cited

U.S. PATENT DOCUMENTS

| | | | |
|---|---|---|---|
| 7,415,272 B2 * | 8/2008 | Khushu | G01S 19/24 370/468 |
| 9,838,192 B2 * | 12/2017 | Zhang | H04L 5/001 |

(Continued)

FOREIGN PATENT DOCUMENTS

EP    2525612 B1    10/2016

OTHER PUBLICATIONS

International Search Report and Written Opinion—PCT/US2018/043689—ISA/EPO—dated Oct. 5, 2018.

(Continued)

*Primary Examiner* — Magdi Elhag
(74) *Attorney, Agent, or Firm* — Kilpatrick Townsend & Stockton, LLP

(57) ABSTRACT

In various implementations, methods, apparatuses, and computer-readable media are described for optimizing tune away carrier selection in a wireless communications system for position determination. The selection of a tune away carrier can be based on, for example, timing information related to pre-scheduled periods for receiving wireless position measurement signals, timing information related to pre-scheduled downlink data reception, timing information related to pre-scheduled uplink data transmission, etc.

26 Claims, 20 Drawing Sheets

(56) References Cited

U.S. PATENT DOCUMENTS

| | | | |
|---|---|---|---|
| 10,314,012 | B2 | 6/2019 | Kumar et al. |
| 2005/0245253 | A1 | 11/2005 | Khushu et al. |
| 2009/0141689 | A1 | 6/2009 | Parekh et al. |
| 2013/0083737 | A1 | 4/2013 | Earnshaw et al. |
| 2013/0336301 | A1 | 12/2013 | Deng et al. |
| 2014/0133415 | A1 | 5/2014 | Damnjanovic et al. |
| 2015/0296475 | A1 | 10/2015 | Burroughs et al. |
| 2015/0327198 | A1 | 11/2015 | Axmon et al. |
| 2015/0333890 | A1 | 11/2015 | Yang et al. |
| 2015/0350934 | A1 | 12/2015 | Yang et al. |
| 2015/0350982 | A1 | 12/2015 | Batchu et al. |
| 2016/0014706 | A1 | 1/2016 | Vajapeyam et al. |
| 2016/0242091 | A1 | 8/2016 | Krishnamoorthy et al. |
| 2016/0242181 | A1 | 8/2016 | Ponukumati et al. |
| 2016/0345229 | A1 | 11/2016 | Das et al. |
| 2016/0380665 | A1* | 12/2016 | Lee ................. H04B 1/18 455/552.1 |
| 2017/0006530 | A1 | 1/2017 | Shi et al. |
| 2017/0034840 | A1* | 2/2017 | Mandil ............. H04W 24/10 |
| 2017/0257807 | A1 | 9/2017 | Zacharias et al. |
| 2017/0289889 | A1* | 10/2017 | Sahu ............. H04L 43/0888 |
| 2018/0184452 | A1 | 6/2018 | Bitra et al. |
| 2019/0097696 | A1* | 3/2019 | Kumar |
| 2019/0097740 | A1* | 3/2019 | Kumar ............. H04B 17/309 |
| 2019/0208543 | A1* | 7/2019 | Dhanapal ............. H04W 8/24 |

OTHER PUBLICATIONS

QUALCOMM Europe: "Qualcomm Proposal for E-UTRAN Architecture and Protocols", 3GPP TSG-RAN2 Meeting #49, 3GPP Draft; R2-052921, 3rd Generation Partnership Project (3GPP), Mobile Competence Centre; 650, Route Des Lucioles; F-06921 Sophia-Antipolis Cedex; France, vol. 1, No. Seoul, Korea; Nov. 7, 2005, Nov. 7, 2005 (Nov. 11, 2005), pp. 1-36, XP050130142.

* cited by examiner

| Carrier frequency bands | Throughput contribution | Timing advance command expected to arrive by | Scheduled time for receiving PRS signal |
|---|---|---|---|
| f-0 | 30% | sf 100 | sf 200 |
| f-1 | 10% | sf 250 | |
| f-2 | 20% | sf 250 | |

| TAG ID | Carrier frequency bands | Timing advance command expected to arrive by | Throughput contribution |
|---|---|---|---|
| A | f-502a | sf 100 | 70% |
| A | f-502c |  | 10% |
| B | f-502b | sf 240 | 20% |

Scheduled time for receiving PRS signal: sf 200

CARRIER SELECTION FOR POSITION MEASUREMENT

CROSS-REFERENCE TO RELATED APPLICATION

This application is a divisional of U.S. application Ser. No. 15/712,585, filed Sep. 22, 2017, titled "CARRIER SELECTION FOR POSITION MEASUREMENT," which is incorporated by reference herein in its entirety for all purposes.

FIELD

This application is related to wireless communication, and more specifically to techniques for selecting a wireless carrier for performing position measurement in a wireless communication network.

BACKGROUND

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of cells that can support communication for a number of user equipments (UEs). The term "cell" can refer to a coverage area of a base station and/or a base station subsystem serving the coverage area. A UE may perform wireless data communication with a serving cell, or with multiple serving cells, using a plurality of wireless carriers of different frequency bands. The term "wireless carrier" refers to a radio signal that oscillates at a frequency within a particular frequency band, and can be modulated to carry certain information. Throughout the rest of the disclosure, "wireless carrier" and "carrier" are used interchangeably.

To perform a measurement, such as position measurement, the UE may need to perform a tune away process, in which the UE tune away from one of the plurality of wireless carriers, to temporarily suspend the wireless communication on that carrier, in order to provide the hardware resources for the measurement.

SUMMARY

Techniques are described for facilitating wireless communication. More specifically, to perform a measurement, such as position measurement, the UE may need to temporarily suspend the wireless communication on one of the plurality of wireless carriers to provide the hardware resources for the measurement. The present disclosure provides techniques for selecting a wireless carrier for tune away ("a tune away carrier") based on predicted degradations in the data throughput of the UE when wireless communication is suspended on that wireless carrier.

According to one example, a method for wireless communication is provided. The method may comprise identifying a set of candidate carriers, wherein the set of candidate carriers are associated with at least one of: downlink data reception, uplink data transmission, or any combination thereof. The method may further comprise obtaining first timing information relating to one or more pre-scheduled tune away periods for receiving wireless position measurement signals, obtaining second timing information relating to pre-scheduled downlink data reception or pre-scheduled uplink data transmission for each candidate carrier of the set of candidate carriers, and selecting, from the set of candidate carriers, a tune away carrier based on the first timing information and the second timing information. The method may further comprise: during the one or more pre-scheduled tune away periods, controlling a wireless communication interface to: tune away from the tune away carrier to suspend downlink data reception or uplink data transmission using the tune away carrier, and tune to another carrier to receive the wireless position measurement signals.

In some aspects, the second timing information includes a pre-scheduled timing window for receiving a timing advance command for each carrier of the set of candidate carriers. The selection of the tune away carrier based on the first timing information and the second timing information may further comprise: determining that there is at least one carrier in the set of candidate carriers for which there is no overlap between the pre-scheduled timing window and the one or more pre-scheduled tune away periods, and selecting the carrier from the at least one carrier.

In some aspects, the method may further comprise determining the pre-scheduled timing window based on data received from a time alignment timer. In some embodiments, the carrier may be selected based on having a lowest throughput among the determined at least one carrier.

In some aspects, the selection of the tune away carrier based on the first timing information and the second timing information may comprise determining that each carrier of the set of candidate carriers has an overlap between the pre-scheduled timing window of each respective carrier and the one or more pre-scheduled tune away periods, and selecting the tune away carrier based on determining whether each carrier of the set of candidate carriers is associated with one or more timing advance groups (TAGs).

In some aspects, the selection of the tune away carrier based on the first timing information and the second timing information may comprise determining that at least one carrier is not associated with the one or more TAGs, and selecting the tune away carrier from the determined at least one carrier. The tune away carrier may be selected based on the carrier having a lowest throughput among the determined at least one carrier.

In some aspects, the selection of the tune away carrier based on the first timing information and the second timing information may comprise: responsive to determining that each carrier of the set of candidate carriers is associated with the one or more TAGs: determining an accumulative throughput for each TAG of the one or more TAGs based on accumulative throughputs of a subset of candidate carriers associated with each respective TAG; determining, from the one or more TAGs, a first TAG associated with a lowest accumulative throughput among the one or more TAGs; and selecting the tune away carrier from the subset of candidate carriers associated with the first TAG. The tune away carrier may be selected based on having a lowest throughput among the subset of candidate carriers associated with the first TAG.

In some aspects, the first timing information and the second timing information are represented based on subframe positions in the uplink data transmission or the downlink data reception.

In some aspects, the wireless communication method may further comprise: transmitting a request for measurement gaps for receiving the wireless positional measurement signals using a second carrier; and during a scheduled tune away period associated with the second carrier, controlling the wireless communication interface to tune away from the tune away carrier to the second carrier to receive the wireless position measurement signals.

According to another example, a method for wireless communication is provided. The method may comprise: identifying a set of candidate carriers, wherein the set of candidate carriers are associated with at least one of: downlink data reception, uplink data transmission, or any combination thereof; determining whether the set of candidate carriers are associated with one or more cross-carrier scheduling (CCS) groups; and selecting, from the set of candidate carriers, a tune away carrier based on whether the carrier is associated with the one or more CCS groups. The method may further comprise: during one or more pre-scheduled tune away periods for receiving wireless position measurement signals, controlling a wireless communication interface to: tune away from the tune away carrier to suspend downlink data reception or uplink data transmission using the tune away carrier, and tune to another carrier to receive the wireless position measurement signals.

In some aspects, the selection of the tune away carrier based on whether the carrier is associated with the one or more CCS groups may comprise: based on a determination that each carrier of the set of candidate carriers is associated with the one or more CCS groups: determining an accumulative throughput for each CCS group of the one or more CCS groups based on accumulative throughputs of a subset of candidate carriers associated with each respective CCS group; selecting, from the one or more CCS groups, a first CCS group associated with a lowest throughput among the one or more CCS groups; and selecting the carrier from the subset of candidate carriers associated with the first CCS group. The carrier may be selected based on having a lowest throughput among the subset of candidate carriers associated with the first CCS group.

In some aspects, the selection of the tune away carrier based on whether the carrier is associated with the one or more CCS groups may comprise: obtaining first timing information relating to one or more first pre-scheduled periods for receiving wireless position measurement signals; obtaining second timing information relating to one or more second pre-scheduled periods for transmission of downlink control information (DCI) including cross-carrier scheduling information for a parent carrier among the candidate carriers associated with the first CCS group; and based on a determination that there is an overlap between the one or more first pre-scheduled periods and the one or more second pre-scheduled periods, excluding the parent carrier from the subset of candidate carriers associated with the first CCS group being considered to be the tune away carrier.

In some aspects, the first timing information and the second timing information are represented based on subframe positions in the uplink data transmission or the downlink data reception.

In some aspects, the selection of the tune away carrier based on whether the carrier is associated with the one or more CCS groups comprises: determining that at least one carrier of the set of candidate carriers is not associated with the one or more CCS groups, and selecting the tune away carrier from the determined at least one carrier. The carrier can be selected based on the carrier having a lowest throughput among the determined at least one carrier.

In some aspects, the method may further comprise: transmitting a request for measurement gaps for receiving the wireless positional measurement signals using a second carrier; and during a scheduled tune away period associated with the second carrier, controlling the wireless communication interface to tune away from the tune away carrier to the second carrier to receive the wireless position measurement signals.

According to another example, a user equipment (UE) is provided. The UE may comprise a wireless communication interface, a memory, and a processing unit communicatively coupled with the memory and the wireless communication interface and configured to cause the UE to: identify a set of candidate carriers, wherein the set of candidate carriers are associated with at least one of: downlink data reception, uplink data transmission, or any combination thereof; obtain first timing information relating to one or more pre-scheduled tune away periods for receiving wireless position measurement signals; obtain second timing information relating to pre-scheduled downlink data reception or pre-scheduled uplink data transmission for each candidate carrier of the set of candidate carriers; and select, from the set of candidate carriers, a tune away carrier based on the first timing information and the second timing information. The processing unit may also be configured to cause the UE to: during the one or more pre-scheduled tune away periods, control the wireless communication interface to tune away from the tune away carrier to suspend downlink data reception or uplink data transmission using the tune away carrier, and to tune to another carrier to receive the wireless position measurement signals.

In some aspects, the processing unit is further configured to cause the UE to: determine that there is at least one carrier in the set of candidate carriers for which there is no overlap between the pre-scheduled timing window and the one or more pre-scheduled tune away periods, and select the carrier from the determined at least one carrier.

In some aspects, the processing unit is further configured to determine the pre-scheduled timing window based on data received from a time alignment timer. The processing unit may be further configured to select the carrier based on the carrier having a lowest throughput among the at least one carrier.

In some aspects, the processing unit is further configured to cause the UE to: responsive to determining that each carrier of the set of candidate carriers has an overlap between the pre-scheduled timing window of each respective carrier and the one or more pre-scheduled tune away periods, and select the carrier based on determining whether each carrier of the set of candidate carriers is associated with one or more timing advance groups (TAGs).

In some aspects, the processing unit is further configured to cause the UE to, responsive to determining that at least one carrier is not associated with the one or more TAGs, and select the carrier from the determined at least one carrier. The carrier may be selected based on having a lowest throughput among the determined at least one carrier.

In some aspects, the processing unit is further configured to cause the UE to: responsive to determining that each carrier of the set of candidate carriers is associated with the one or more TAGs: determine an accumulative throughput for each TAG of the one or more TAGs based on accumulative throughputs of a subset of candidate carriers associated with each respective TAG; determine, from the one or more TAGs, a first TAG associated with a lowest accumulative throughput among the one or more TAGs; and select the carrier from the subset of candidate carriers associated with the first TAG. The tune away carrier may be selected for having a lowest accumulative throughput among the subset of candidate carriers associated with the first TAG.

In some aspects, the processing unit is further configured to cause the UE to: transmit a request for measurement gaps for receiving the wireless positional measurement signals using a second carrier; and during a scheduled tune away period associated with the second carrier, control the wireless communication interface to tune away from the tune away carrier to the second carrier to receive the wireless position measurement signals.

According to another example, a UE is provided. The UE may comprise a wireless communication interface, a memory, and a processing unit communicatively coupled with the memory and the wireless communication interface and configured to cause the UE to: identify a set of candidate carriers, wherein the set of candidate carriers are associated with at least one of: downlink data reception, uplink data transmission, or any combination thereof; determine whether the set of candidate carriers are associated with one or more cross-carrier scheduling (CCS) groups; and select, from the set of candidate carriers, a tune away carrier based on whether the tune away carrier is associated with the one or more CCS groups. The processing unit is further configured to cause the UE to, during one or more pre-scheduled tune away periods for receiving wireless position measurement signals, control the wireless communication interface to tune away from the tune away carrier to suspend downlink data reception or uplink data transmission using the tune away carrier, and to tune to another carrier to receive the wireless position measurement signals.

In some aspects, the processing unit is further configured to cause the UE to: based on a determination that each carrier of the set of candidate carriers is associated with the one or more CCS groups: determine a throughput for each CCS group of the one or more CCS groups based on accumulative throughputs of a subset of candidate carriers associated with each respective CCS group; select, from the one or more CCS groups, a first CCS group associated with a lowest accumulative throughput among the one or more CCS groups; and select the tune away carrier from the subset of candidate carriers associated with the first CCS group. The tune away carrier may be selected based on having a lowest throughput among the subset of candidate carriers associated with the first CCS group.

In some embodiments, the processing unit is further configured to cause the UE to: obtain first timing information relating to one or more first pre-scheduled periods for receiving wireless position measurement signals; obtain second timing information relating to one or more second pre-scheduled periods for transmission of downlink control information (DCI) including cross-carrier scheduling information for a parent carrier among the candidate carriers associated with the first CCS group; and based on a determination that there is an overlap between the one or more first pre-scheduled periods and the one or more second pre-scheduled periods, exclude the parent carrier from the subset of candidate carriers associated with the first CCS group being considered to be the tune away carrier.

In some aspects, the processing unit is further configured to cause the UE to: based on a determination that at least one carrier of the set of candidate carriers is not associated with the one or more CCS groups, select the tune away carrier from the at least one carrier. The tune away carrier may be selected based on having a lowest throughput among the at least one carrier.

In some aspects, the processing unit is further configured to cause the UE to: transmit a request for measurement gaps for receiving the wireless positional measurement signals using a second carrier; and during a scheduled tune away period associated with the second carrier, control the wireless communication interface to tune away from the tune away carrier to the second carrier to receive the wireless position measurement signals.

According to another example, an apparatus for wireless communication is provided. The apparatus may comprise: means for identifying a set of candidate carriers, wherein the set of candidate carriers are associated with at least one of: downlink data reception, uplink data transmission, or any combination thereof; means for obtaining first timing information relating to one or more pre-scheduled tune away periods for receiving wireless position measurement signals; means for obtaining second timing information relating to pre-scheduled downlink data reception for each candidate carrier of the set of candidate carriers; means for selecting, from the set of candidate carriers, a carrier based on the first timing information and the second timing information; and means for during the one or more pre-scheduled periods for receiving wireless position measurement signals, controlling a wireless communication interface to: tune away from the tune away carrier to suspend downlink data reception using the tune away carrier, and tune to another carrier to receive the wireless position measurement signals.

According to another example, an apparatus for wireless communication is provided. The apparatus may comprise: means for identifying a set of candidate carriers, wherein the set of candidate carriers are associated with at least one of: downlink data reception, uplink data transmission, or any combination thereof; means for determining whether the set of carriers are associated with one or more cross-carrier scheduling (CCS) groups; means for selecting, from the set of candidate carriers, a tune away carrier based on whether the tune away carrier is associated with the one or more CCS groups; and means for during the one or more pre-scheduled tune away periods for receiving wireless position measurement signals, controlling a wireless communication interface to: tune away from the tune away carrier to suspend downlink data reception using the v carrier, and tune to another carrier to receive the wireless position measurement signals.

According to another example, a non-transitory computer-readable medium is provided. The medium may store instructions that, when executed by one or more processing circuits, cause the one or more processing circuits to perform any of the disclosed methods.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments are described in detail below with reference to the following drawing figures:

FIG. 4 illustrates an example of data records created to facilitate the wireless communications illustrated in FIG. 3A and FIG. 3B.

FIG. 6 illustrates an example of data records created to facilitate the wireless communications illustrated in FIG. 5.

DETAILED DESCRIPTION

Figure 1:
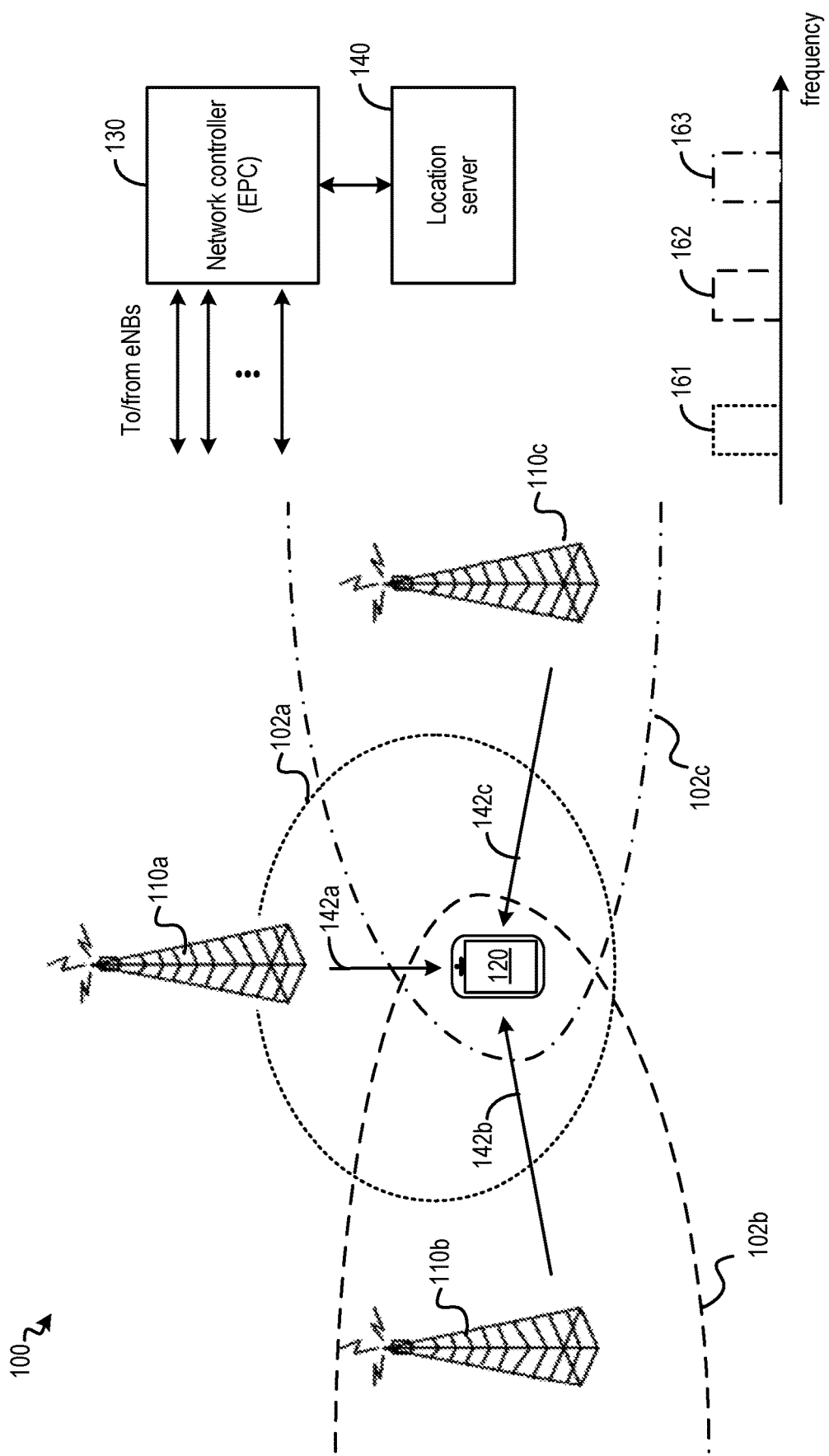
FIG. 1 is a block diagram illustrating a wireless communication system.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of the various embodiments. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the various embodiments as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

A UE may perform wireless data communication with a serving cell, or with multiple serving cells, using a plurality of wireless carriers of different frequency bands. To perform a measurement, such as position measurement, the UE may need to select one of the plurality of wireless carriers as a tune away carrier, and temporarily tune away from the tune away carrier to suspend part of the wireless data communication using the tune away carrier. The tune away process is to free up hardware resources at the UE to receive signals for the measurement. However, the suspension of the wireless communication may affect the data throughput of the UE. The effect on the data throughput is further exacerbated if the tune away carrier carries configuration information and/or scheduling information related to the other carriers. Because of the disruption in the transmission of the configuration and/or scheduling information for the other carriers, wireless data communication involving the other carriers may be disrupted as well, which further degrades the data throughput of the UE.

Disclosed are techniques for selecting a wireless carrier for tune away ("a tune away carrier"), to mitigate the disruption to the wireless communication using the plurality of wireless carriers. The techniques can include determining pre-scheduled periods for receiving wireless position measurement signals, and selecting a tune away carrier for which pre-scheduled downlink receptions of certain configuration and/or scheduling information related to other carriers does not overlap with the pre-scheduled periods for receiving the wireless position measurement signals. Alternatively, a carrier that does not carry scheduling information for other carriers can also be selected as the tune away carrier. In a cases where all of the plurality of wireless carriers have such overlaps, or that all of the plurality of carriers carry scheduling information for other carriers, a wireless carrier that contributes the lowest data throughput can be selected as the tune away carrier. During the one or more pre-scheduled periods for receiving wireless position measurement signals, a receiver can be controlled to tune away from the tune away carrier to suspend downlink data reception or uplink data transmission using the tune away carrier, and to tune to another carrier to receive the wireless position measurement signals. With such arrangements, the disruption to the wireless data communication by position measurement can be mitigated.

The techniques described herein may be used for various wireless communication networks such as CDMA, TDMA, FDMA, OFDMA, SC-FDMA and other wireless networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi and Wi-Fi Direct), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-A, and LTE/LTE-A terminology is used in much of the description below.

FIG. 1 shows a wireless communication network 100, which may be an LTE network or some other wireless network. Wireless network 100 may include a number of evolved Node Bs (eNBs) 110 and other network entities. An eNB may be an entity that communicates with the UEs and may also be referred to as a base station, a Node B, an access point, etc. Each eNB may provide communication coverage for a particular geographic area and may support communication for the UEs located within the coverage area. To improve network capacity, the overall coverage area of an eNB may be partitioned into multiple (e.g., three) smaller areas. Each smaller area may be served by a respective eNB subsystem. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). In the example shown in FIG. 1, eNBs 110*a*, 110*b* and 110*c* may be macro eNBs for macro cells 102*a*, 102*b* and 102*c*, respectively. Some or all of eNBs 110*a*, 110*b*, and 110*c* may also be a pico eNB, and the associated cell (102*a*, 102*b*, or 102*c*) can be a pico cell. Some or all of eNBs 110*a*, 110*b*, and 110*c* may also be a femto eNB, and the associated cell (102*a*, 102*b*, or 102*c*) can be a femto cell. For the rest of disclosure, the terms "cell", "eNB", and "base station" may be used interchangeably, and the eNB is not limited to a macro eNB, a pico eNB, or a femto cell.

A network controller 130 may be coupled to a set of eNBs, and may provide coordination and control for these eNBs. Network controller 130 may comprise a single network entity or a collection of network entities that form part of the evolved packet core (EPC). Network controller 130 may communicate with the eNBs via a backhaul. The eNBs may also communicate with one another, e.g., directly or indirectly via a wireless or wireline backhaul. A location/positioning server 140 may couple to network controller 130 and may support location services and/or positioning for UEs. Positioning refers to a functionality that determines a geographical location of a target UE. Location services refer to services that utilize location information (e.g., location estimates for UEs).

One or more UEs 120 may be dispersed throughout wireless network 100, and each UE may be stationary or mobile. A UE may also be referred to as a mobile station, a terminal, an access terminal, a subscriber unit, a station, etc. A UE may be a cellular phone, a smart phone, a tablet, a wireless communication device, a personal digital assistant (PDA), a wireless modem, a handheld device, a laptop computer, a cordless phone, a wireless local loop (WLL) station, a netbook, a smartbook, etc. A UE may communicate with an eNB via the downlink and uplink. The downlink (or forward link) refers to the communication link from the eNB to the UE, and the uplink (or reverse link) refers to the communication link from the UE to the eNB. A UE may also be able to communicate peer-to-peer (P2P) with other UEs. With the communication link, the UE and eNB can transmit a set of information, in the form of radio signals, at different time intervals. A set of radio signals across a range of time intervals can form a radio frame.

Wireless network 100 may support operation on a single carrier frequency band or, in the example of FIG. 1, multiple carriers of multiple frequency bands. For example, cell 102*a* may be associated with a carrier of frequency band 161, cell 102*b* may be associated with a carrier of frequency band 162, and cell 102*c* may be associated with a carrier of frequency band 163. With LTE, each of these frequency bands can be associated with a bandwidth of 1.4, 3, 5, 10, 15, and 20 MHz. These frequency bands can be contagious or, in the example of FIG. 1, non-contagious. Each of these frequency bands can be further divided into a plurality of sub-carriers, each of which has a bandwidth of 7.5 kHz or 15 kHz. For example, assuming a sub-carrier has a bandwidth of 15 kHz, a carrier with a bandwidth of 1.4 MHz may include about 72 sub-carriers, and another carrier with a bandwidth of 20 MHz may include about 1200 sub-carriers. As to be discussed in more details below, each of the sub-carrier can be used for uplink and downlink transmission of radio frames.

In some embodiments, the carriers associated with cells 102*a*, 102*b*, and 102*c* can be the component carriers of a carrier aggregation (CA) scheme, in which UE 120 can simultaneously communicate with each of eNBs 110a, 110b, and 110c using these component carriers to improve throughput/bandwidth of communication. For example, the carriers can be used for both uplink and downlink transmission between UE 120 and each of eNBs 110a, 110b, and 110c. Cells operating on the same frequency may be referred to as intra-frequency cells. Cells operating on different frequencies may be referred to as inter-frequency cells. In the example of FIG. 1, cells 102a, 102b, and 102c can all be inter-frequency cells. One of these cells (e.g., cell 102a) can be a primary serving cell and associated with a primary component carrier (PCC), whereas the rest of the cells (e.g., cells 102b and 102c) can be secondary serving cells and associated with secondary component carriers (SCC). The PCC is the main carrier in a group of carriers provided to the UE and is only changed at handover, whereas the SCCs are added and removed to the list of carriers provided to UE to perform data communication as needed. As to be discussed in more details below, PCC may also carry cross-carrier scheduling information to schedule the transmission of data across a set of carriers including the PCC and the SCCs.

In some embodiments, UE 120 may perform measurements of cells 102a, 102b, and 102c, and provide the measurements results to location/positioning server 140 to determine the position of UE 120, or to improve the accuracy of the location estimates. For example, UE 120 may make measurements for observed time difference of arrival (OTDOA) of cells 102a, 102b, and 102c. An OTDOA measurement can be based on differences in time of arrival (TOA) of positional signals received by UE 120 from each of cells 102a, 102b, and 102c. For example, UE 120 may receive positional signals 142a, 142b, and 142c from, respectively, cell 102a, cell 102b, and cell 102c. UE 120 can provide the TOA difference measurements between any two of these positional signals (e.g., between positional signals 142a and 142b, between positional signals 142b and 142c, and between positional signals 142a and 142c) to location/positioning server 140. Based on the TOA difference measurements, as well as the known geographical locations of eNBs 110a, 110b, and 110c, location/positioning server 140 can determine a location estimate of UE 120.

Figure 2A:
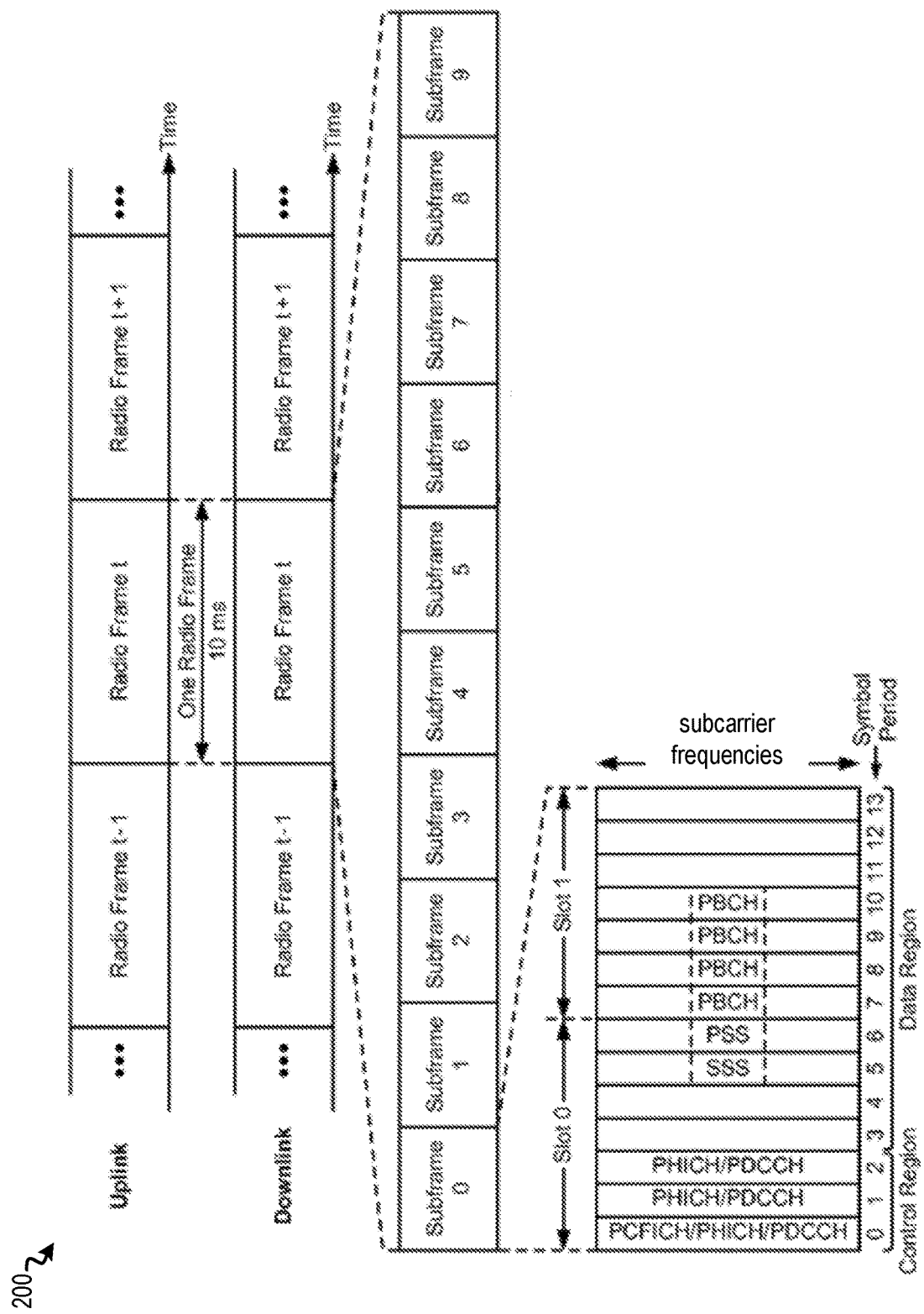
FIGS. 2A, 2B, 2C and 2D illustrate examples of radio transmissions in the wireless communication system of FIG. 1.

FIG. 2A shows an exemplary frame structure 200 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The symbols can be used to represent the information to be transmitted. The 2L symbol periods in each subframe may be assigned indices of 0 through 2L-1.

Moreover, each slot may also be associated with a number of sub-carriers. The slots (associated with particular subframes and frames), and the subcarriers associated with the slots, can form the basis of a resource block (RB). The resource blocks can be allocated to multiple UEs, an allocation which in turn determines when the UEs transmit and receive information. For example, each UE can be allocated a set of resource blocks in the uplink and downlink radio frames for performing data communication. Based on the set of allocated resource blocks, the UE can transmit data at certain slots (within a certain subframe and frame), and using the sub-carriers associated with those slots to transmit the symbols. To avoid interference and corruption, different UEs are allocated different resource blocks, and different sets of sub-carriers are used for uplink transmission. For example, when two UEs transmit a slot of a radio frame simultaneously, one slot transmitted by one UE will be associated with a different set of sub-carriers from the other slot transmitted by the other UE. Accordingly, the UEs can be scheduled to transmit information using different sets of sub-carriers at different time-intervals. Likewise, based on the allocated resource blocks information, a UE can also selectively process certain slots of radio frames received from the downlink transmission from the eNB, with those slots carrying information targeted at that UE.

As shown in FIG. 2A, on the downlink in LTE, a cell may transmit a Physical Control Format Indicator Channel (PCFICH), a Physical HARQ Indicator Channel (PHICH), and a Physical Downlink Control Channel (PDCCH) in a control region of a subframe. The PCFICH may convey the size of the control region. The PHICH may carry acknowledgement (ACK) and negative acknowledgement (NACK) feedback for data transmission sent on the uplink with HARQ. The PDCCH may carry downlink grants, uplink grants, scheduling information, and/or other control information. The cell may also transmit a Physical Downlink Shared Channel (PDSCH) in a data region of a subframe (not shown in FIG. 2A). The PDSCH may carry data for UEs scheduled for data transmission on the downlink.

As shown in FIG. 2A, on the downlink in LTE, a cell may transmit a Physical Control Format Indicator Channel (PCFICH), a Physical HARQ Indicator Channel (PHICH), and a Physical Downlink Control Channel (PDCCH) in a control region of a subframe. The PCFICH may convey the size of the control region. The PHICH may carry acknowledgement (ACK) and negative acknowledgement (NACK) feedback for data transmission sent on the uplink with HARQ. The PDCCH may carry downlink grants, uplink grants, and/or other control information. The cell may also transmit a Physical Downlink Shared Channel (PDSCH) in a data region of a subframe. The PDSCH may carry data for UEs scheduled for data transmission on the downlink.

The cell may also transmit a primary synchronization signal (PSS) and a secondary synchronization signal (SSS) on the downlink at a center frequency of, e.g., 1.08 MHz of the system bandwidth. For FDD, the PSS and SSS may be transmitted in symbol periods 6 and 5, respectively, in subframes 0 and 5 of each radio frame with the normal cyclic prefix, as shown in FIG. 2A. While not shown in the figure, subframe 5 may also contain other information, such as System Information Block (SIB), which may include radio resource configuration information, common and shared configuration, timers, etc. For example, the SIB block may include a timer for updating an advance time for uplink/downlink synchronization, as to be discussed below. The PSS and SSS may be used by the UEs for cell search and acquisition. The cell may also transmit a Physical Broadcast Channel (PBCH) in symbol periods 0 to 3 in slot 1 of certain radio frames, as shown in FIG. 2A. The PBCH may carry some system information such as a master information block (MIB).

The cell may also transmit a cell-specific reference signal (CRS) in certain symbol periods of each subframe. A reference signal is a signal that is known a priori by a transmitter and a receiver and may also be referred to as a pilot. A CRS is a reference signal that is specific for a cell, e.g., generated based on a cell identity (ID). The cell may transmit a CRS from two antenna ports 0 and 1 in symbol periods 0, 4, 7 and 11 of each subframe. The cell may also transmit the CRS from two additional antenna ports 2 and 3 in symbol periods 1 and 8 of each subframe. The cell may transmit CRS on evenly spaced subcarriers, which may be determined based on the cell ID.

Figure 2B:
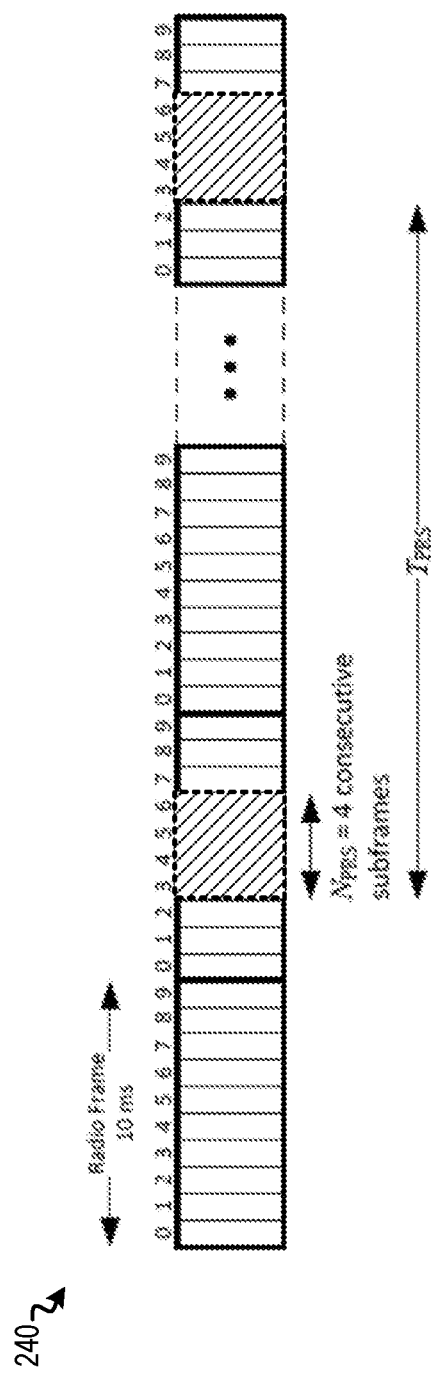
Figure 2C:
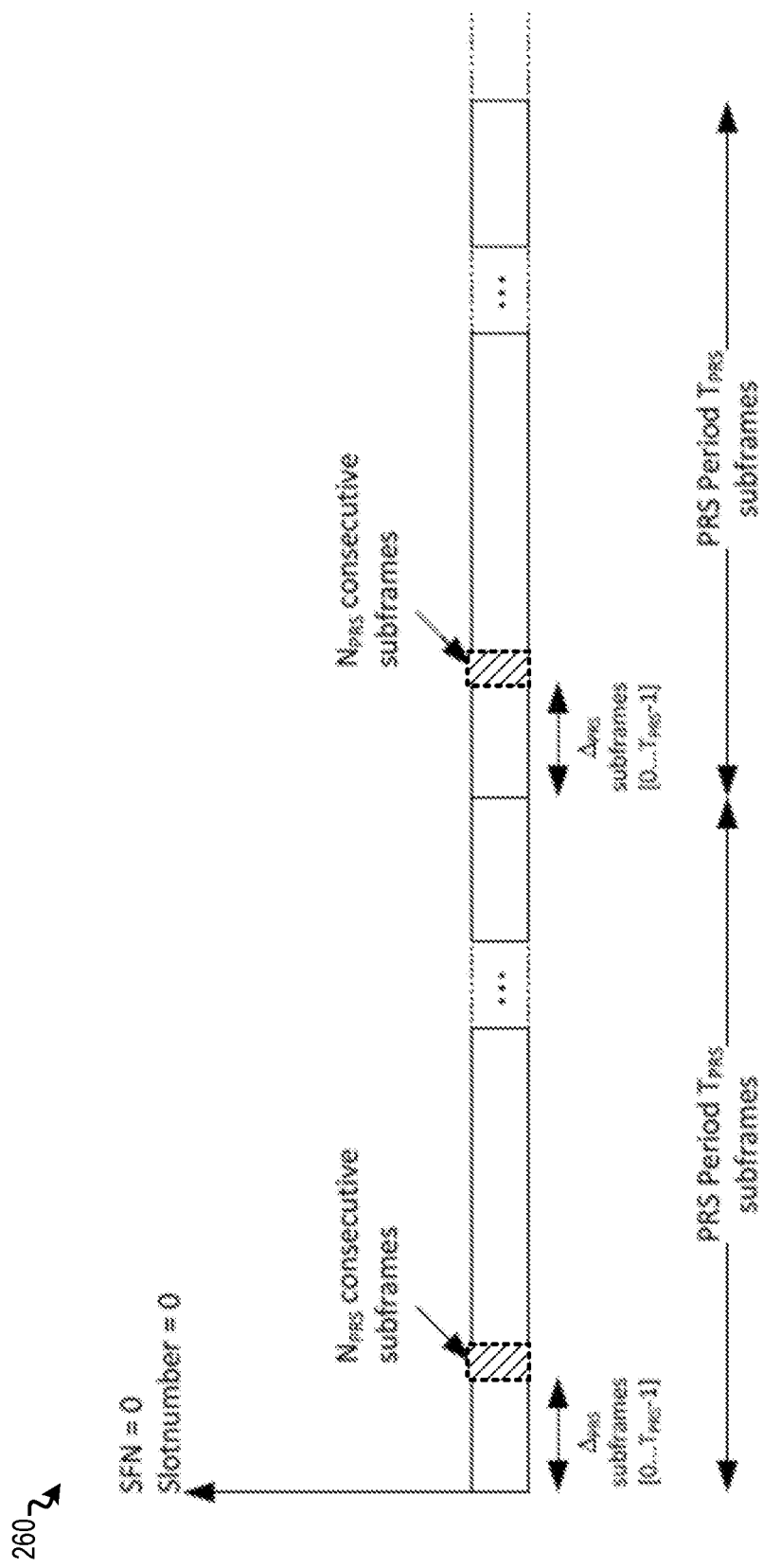

The cell may also transmit other reference signals such as a positioning reference signal (PRS). Diagram 240 of FIG. 2B illustrates an example of transmission of PRS signals. PRS signals are transmitted in pre-defined positioning subframes grouped by consecutive subframes $N_{PRS}$. Each group of positioning subframes can be termed as "positioning occasions" and can occur periodically with a predetermined periodicity $T_{PRS}$. The period $T_{PRS}$ can be, for example, 160, 320, 640, or 1280 subframes, etc. The number of consecutive subframes $N_{PRS}$ can be 1, 2, 4, or 6 subframes. The scheduling of transmission of PRS signals can be configured based on a cell-specific subframe offset APRs, which may define the starting subframe of PRS transmission, relative to a system frame number (SFN). Diagram 260 of FIG. 2C illustrates a relationship between subframe offset $\Delta_{PRS}$ and SFN. SFN can be a timestamp provided by location server 140 to UE 120 as part of OTODA Assistance Data. SFN can be associated with one or more serving cells of the UE, and can serve as a reference for defining the subframe position PRS signals. Based on subframe offset $\Delta_{PRS}$, period $T_{PRS}$, as well as consecutive subframes $N_{PRS}$, the transmission timing of the PRS symbols can be pre-determined. To avoid blanking of PRS symbols, no positioning subframes associated with the PRS symbols should overlap with the subframes of, for example, PBCH, PSS, SSS, etc. The PRS scheduling information can be included in PRS configuration, which can also be part of the OTDOA Reference Cell Info and OTDOA Neighbor Cell Info included in the OTDOA Assistance Data provided by location server 140 to UE 120.

To perform location estimation, UE 120 can perform Reference Signal Time Difference Measurement (RSTD) based on the aforementioned reference signals including, for example, CRS and PRS signals, as well as synchronization signals (e.g., SSS, PSS, etc.). RSTD measurement can be performed based on a signal (e.g., a PRS signal) received from a reference cell (e.g., cell 102a) and a corresponding signal received from a neighboring cell (e.g., cell 102b). In some cases, PRS signals may be preferred for OTDOA because of superior Signal-to-Interference-and-Noise Ratio (SINR) and improved detectability, which can improve the performance of OTDOA positioning. To perform RSTD measurement between, for example, cells 102a and 102b, UE 120 can determine the time when the UE receives the start of one PRS subframe from cell 102a, and the time when the UE receives the start of a corresponding PRS subframe from cell 102b, to determine the TOA difference. UE 120 can also repeat the RSTD measurements between cells 102a and 102c, and between 102b and 102c, and then provide the RSTD measurement results to location server 140. Location server 140 can then estimate the location of UE 120 based on the RSTD results and the known locations of eNBs 110a, 110b, and 110c.

Referring back to FIG. 1, in wireless network 100, UE 120 may perform inter-frequency RSTD measurements, which involves obtaining certain signals (e.g., PRS) at different carriers associated with different frequency bands, in order to support positioning of the UE. To start an inter-frequency RSTD measurement, a UE can select a carrier for receiving PRS signals. The UE can then transmit a request for performing inter-frequency RSTD measurement to a neighboring cell using the selected carrier. The neighboring cell can then schedule the timing for transmitting the PRS signals by configuring a set of measurement gaps, which sets the scheduled PRS transmission periods and durations. Meanwhile, the UE also receives the scheduled PRS transmission periods (e.g., the SFN, subframe offset $\Delta_{PRS}$, period $T_{PRS}$, etc.) associated with that neighboring cell. At (or slightly before) a scheduled PRS transmission period, the UE can receive the PRS signals from the neighboring cell using the selected carrier.

During inter-frequency RSTD measurement, the UE may undergo a tune away process. Due to limited hardware resources, the UE may be able to process a fixed number of radio frequency bands at any given time. As part of the tune away process, the radio-frequency circuitries of the UE may have to selectively stop data communication with a first frequency band (e.g., a serving carrier frequency band), perform carrier frequency tuning to a second frequency band that carries the PRS signal, and then perform carrier frequency tuning again to tune back to the first frequency band to resume the data communication. The frequency tuning can be performed by setting a particular mixer and/or transmitter oscillator frequency, setting a passing-band of a filter for band-passing the wireless signals, etc.

Figure 2D:
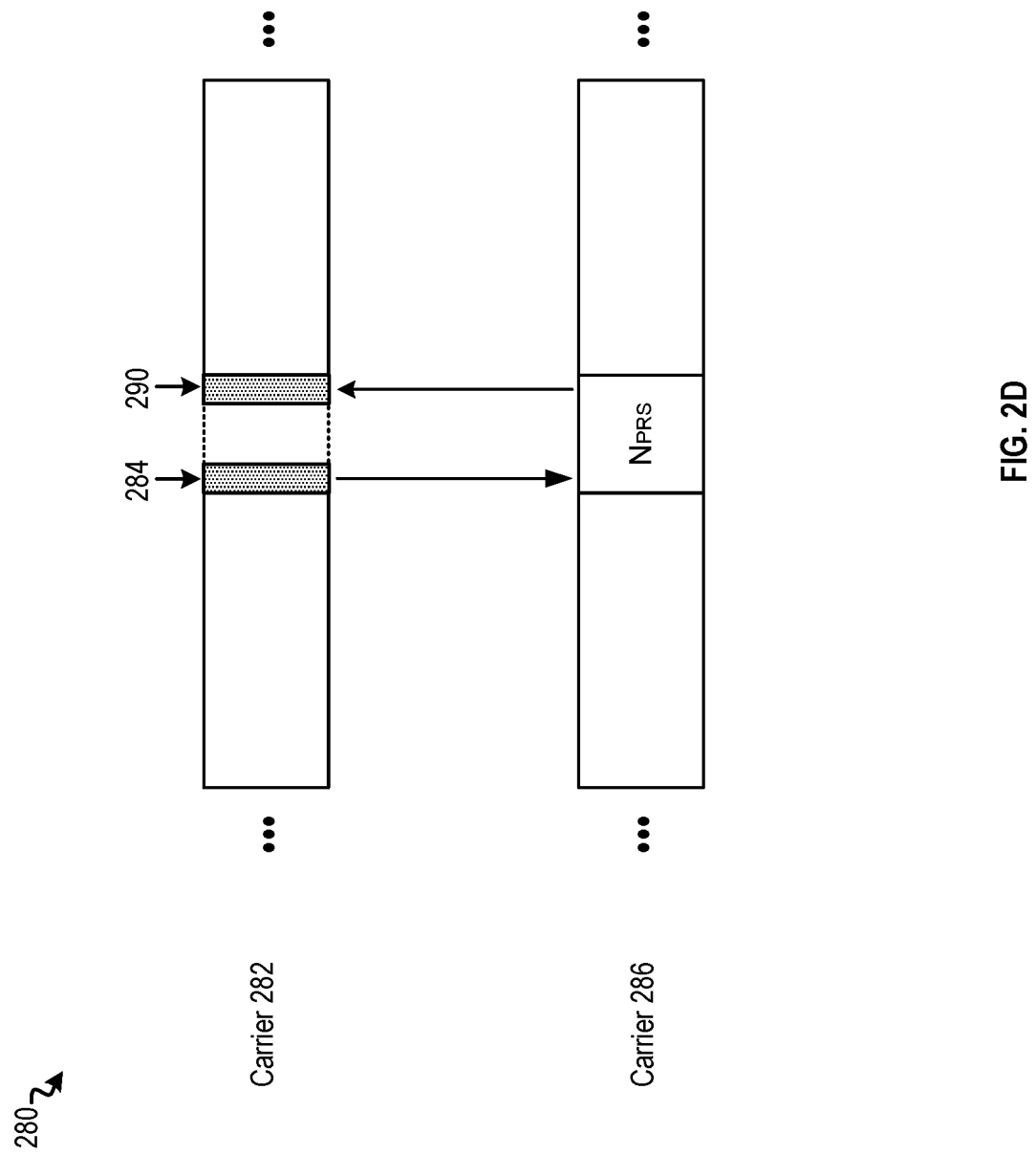

Reference is now made to FIG. 2D, which illustrates an example of an inter-frequency measurement process. Referring to diagram 280 of FIG. 2D, UE 120 was performing regular data communication with eNB 110a using a carrier 282 provided by cell 102a. At subframe 284, UE 120 is scheduled to receive a PRS signal from another cell (e.g., cell 102b). As discussed above, UE 120 can determine the scheduled PRS transmission period as well as the transmitter cells of the PRS signals, based on information included in the OTDOA Assistance Data provided by location server 140. UE 120 can select a carrier 286 for receiving the PRS signals, and transmit a request to perform inter-frequency RSTD measurement to cell 102b using carrier 286. At subframe 284, which corresponds to the start of the scheduled PRS transmission period, UE 120 can tune away from carrier 282 to carrier 286 to receive the consecutive subframes $N_{PRS}$ of PRS signals. At subframe 290, which corresponds to the end of the scheduled PRS transmission period, UE 120 can tune back to carrier 282 to continue the regular data communication with eNB 110a.

The tune away process in FIG. 2D may degrade the wireless data throughput experienced by UE 120, because UE 120 cannot use carrier 282 to receive data (as part of downlink data reception) or transmit data (as part of uplink data transmission) during the tune away period, and the data throughput during that tune away period is lost. The degradation in the data throughput is further exacerbated if carrier 282 contributes substantially to the data throughput experienced by UE 120. For example, carrier 282 may have a high signal quality, a higher bandwidth which provides more subcarriers for resource block allocation, etc. Moreover, UE 120 may also have a receiver chain that is optimized for the frequency band associated with carrier 282. In all these cases, the disruption in data communication with carrier 282 for the tune away process can lead to significant reduction in overall wireless data throughput experienced by UE 120. On the other hand, if carrier 282 does not contribute high data throughput compared with other component carriers available for carrier aggregation, selecting carrier 282 for tune away may not cause as much degradation in the data throughput.

The tune away process in FIG. 2D may also reduce the overall wireless data throughput experienced by UE 120 in some other ways. For example, carrier 282 may be used to transmit configuration information concerning certain data communication operations at UE 120 associated with other carriers at a scheduled time period (e.g., for a particular set of subframes). If that scheduled time period overlaps with the tune away period, UE 120 may be unable to receive the configuration information, and cannot properly perform those data communications with the other carriers. This can lead to substantial degradation to the wireless data throughput experienced by UE 120, as to be discussed below.

Figure 3A:
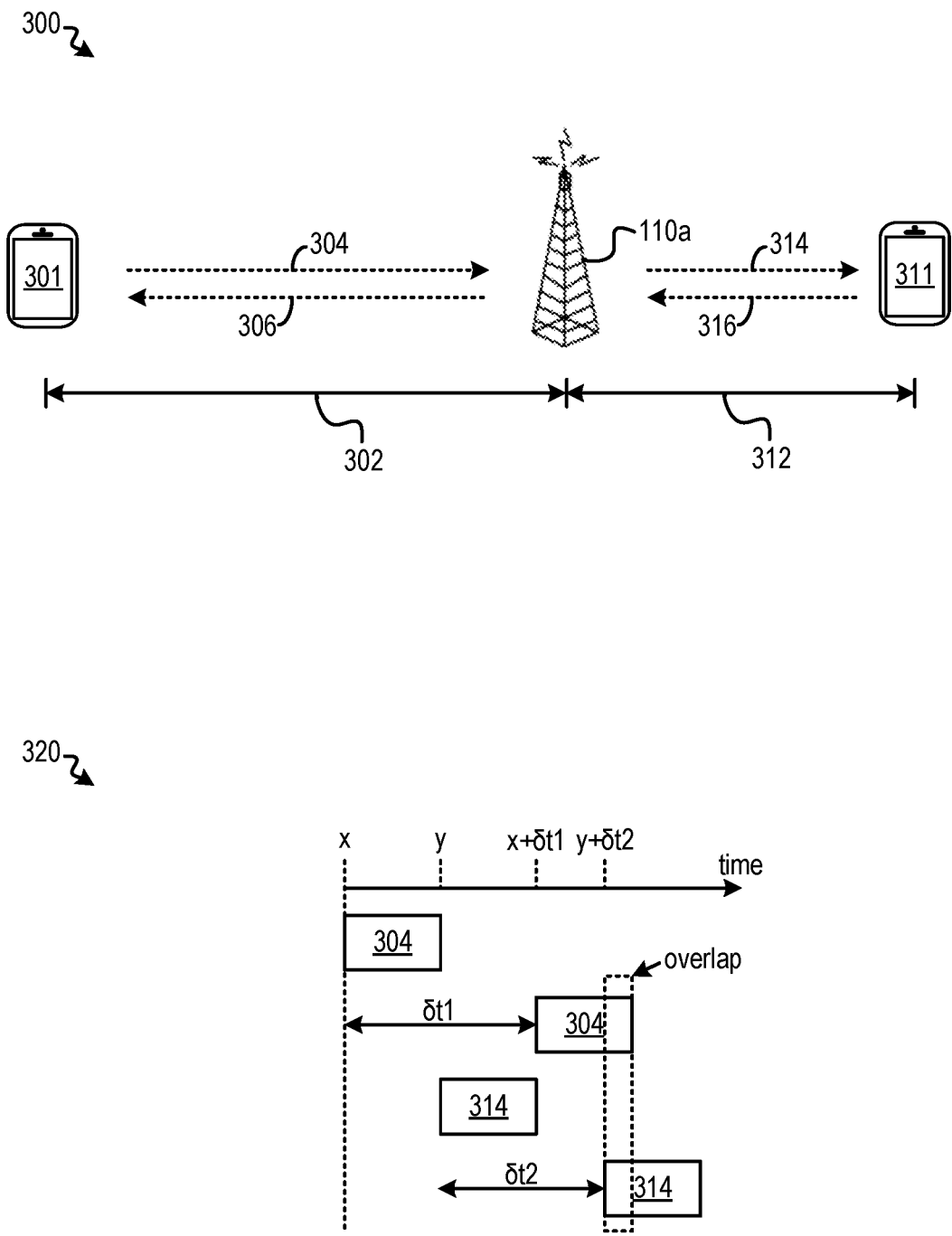
FIG. 3A and FIG. 3B illustrate examples of wireless communication involving timing adjustments.

The aforementioned configuration information may include, for example, timing advance information for synchronizing uplink and downlink transmission among a set of UEs. Reference is now made to FIG. 3A, which illustrates a use case for timing advance information. Referring to diagrams 300 and 320, a UE 301 and eNB 110a are separated by a distance 302. The separation distance introduces a finite propagation delay δt1 in the data transmission between UE 120 and eNB 110a. UE 301 may be scheduled to transmit an uplink subframe 304 at a time point x. Moreover, another UE 311 and eNB 110a are separated by a distance 312. The separation distance introduces a finite propagation delay δt1 in the data transmission between UE 120 and eNB 110a. UE 311 may be scheduled to transmit an uplink subframe 314 at a time point y, which is one frame period after time point x. UE 311 may use some or all of the subcarriers used by UE 301 for transmission of subframe 304, based on an assumption that UE 301 does not use any of these subcarriers for data transmission at time point y.

Referring to diagram 320, UE 301 may receive subframe 304 at a time point x+δt1, and subframe 314 at a time point y+δt2. Due to the difference in propagation delays δt1 and δt2, part of subframes 304 and 314, as received at eNB 110a, may overlap. If both subframes are transmitted using the same set of subcarriers, there can be interference and signal corruption. As a result, both UEs may have to retransmit the subframes again to eNB 110a. The retransmission of the subframes takes away radio resources that are otherwise available for carrying other information, which also leads to degradation in data throughput experienced by each UEs.

To mitigate the data throughput degradation caused by the propagation delays, both UEs can receive timing advance information from eNB 110a to synchronize the uplink transmission with reception of downlink data. For example, assuming UE 301 is scheduled to receive downlink subframe 306 at a time point a, and UE 311 is scheduled to receive downlink subframe 316 at a time point b. UE 301 can start uplink transmission of subframe 304 at a round trip period (2×δt1) ahead of time point a. UE 311 can also start uplink transmission of subframe 314 at a round trip period (2×δt2) ahead of time point b. The timing advance information may include the round trip period information for each UE, which can then apply the timing advance information to set the uplink transmission of the subframes ahead of the scheduled reception of the downlink subframes.

In some embodiments, eNB 110a may transmit a timing advance command to each of UE 301 and 311 as part of the downlink communication. The timing advance command can be generated by the Medium Access Control Control Element (MAC CE), which can be part of the MAC protocol stack at eNB 110a. The eNB 110a can continuously measure timing of uplink signals received from UEs 301 and 311, to generate the timing advance information. The base station can then transmit the timing advance information to UEs 301 and 311. In a case where the UE communicate with multiple eNBs using different component carriers under the carrier aggregation scheme, the UE may receive a timing advance command with one component carrier from each of the eNBs.

Moreover, eNB 110a can also set a time period within which UEs 301 and 311 are supposed to use a particular timing advance setting provided by eNB 110a. It may be necessary to update the timing advance setting to account for movements and change in positions of UEs 301 and 311, which can affect the propagation delay experienced by the uplink and downlink communication for each of these UEs. Within the pre-set time period, eNB 110a is committed to transmit a new timing advance command to the UEs. In some embodiments, the pre-set time period information can be provided in the form of a series of timestamps (e.g., represented by subframe numbers), based on which the UE can determine when to expect a new timing advance command. In some embodiments, eNB 110a can provide the time period information using a configurable timer command called timeAlignmentTimer, which can be transmitted to the UE via dedicated signaling or as part of the SIB block. In a case where the UE communicate with multiple eNBs using different component carriers under the carrier aggregation scheme, the UE may receive a different timeAlignmentTimer command (associated with a component carrier) from each of the eNBs.

Figure 3B:
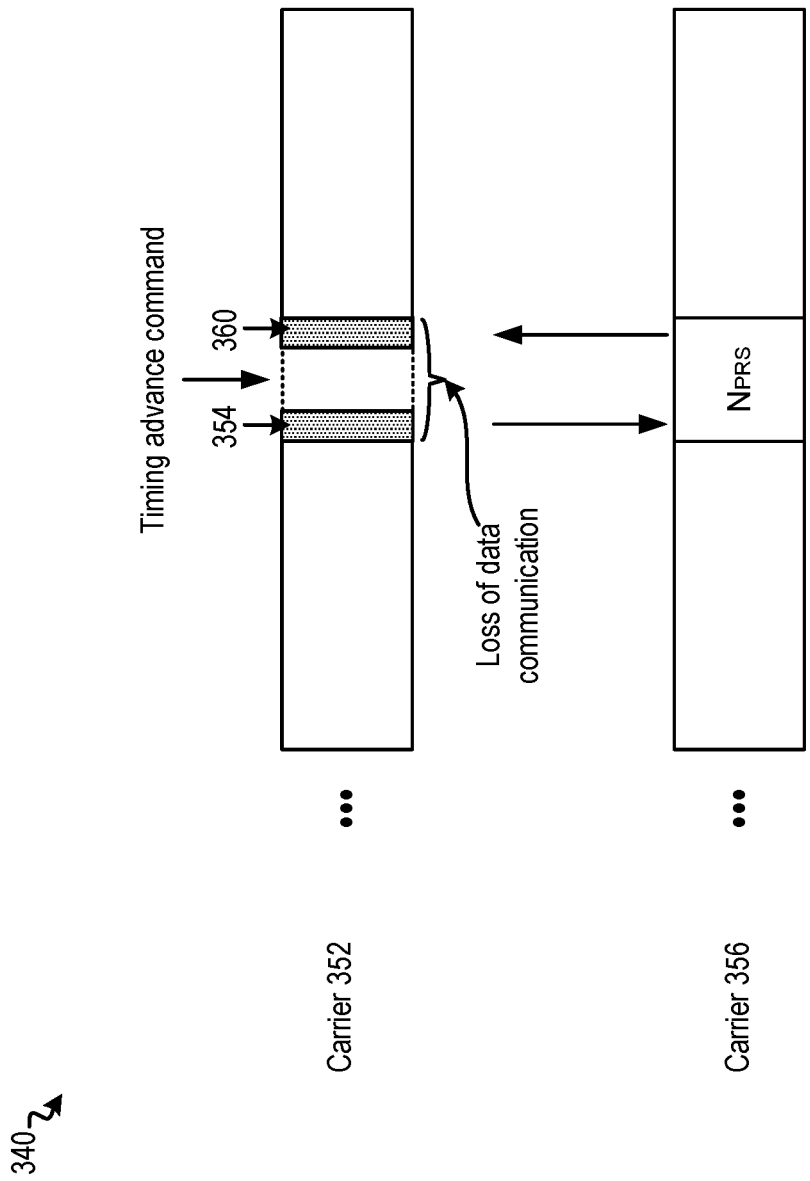

A UE may be unable to receive the timing advance command (with updated timing advance information) during the inter-frequency measurement process. Reference is now made to FIG. 3B, which illustrates another example of the inter-frequency measurement process. Referring to diagram 340 of FIG. 3B, UE 301 was performing regular data communication with eNB 110a using a carrier 352 provided by cell 102a. At subframe 354, UE 301 is scheduled to receive a PRS signal from another cell (e.g., cell 102b). At subframe 354, which corresponds to the start of the scheduled PRS transmission period, UE 301 can tune away from carrier 352 to carrier 356 to receive the consecutive subframes $N_{PRS}$ of PRS signals. At subframe 360, which corresponds to the end of the scheduled PRS transmission period, UE 301 can tune back to carrier 352 to continue the regular data communication with eNB 110a.

As discussed above, UE 301 may also receive a timing advance command including updated timing advance information from eNB 110a to synchronize transmission of uplink subframes. As discussed above, the synchronization is to prevent loss of uplink subframe data at eNB 110a due to interference, which may require UE 301 to retransmit the subframe and lead to degradation in data throughput. Here, if the timing advance command is scheduled to come during the tune away period (e.g., between subframes 354 and 360) on carrier 352, UE 301 may be unable to receive the timing advance command and the updated timing advance information. In such as case, UE 301 may use stale timing advance information in synchronizing its uplink transmission, which can lead to loss of uplink data at eNB 110a and data throughput degradation, as discussed above.

In some embodiments, to mitigate the degradation of data throughput due to tune away process, a UE can maintain a record of data throughput contribution associated with a set of carriers, and perform a selection process to select a carrier for tune away based on the information in the record. The set of carriers can include, for example, a set of component carriers available to be aggregated for data transmission/reception by the UE. The UE can determine a set of metrics related to data throughput with each of the set of carriers. For example, the UE may determine, within a timing window, which of the set of component carriers is used to transmit/receive data, a number of bytes of data transmitted/received during the timing window, how many of those data bytes are the result of retransmission, etc. Based on the metrics, the UE can determine a throughput contribution by that particular component carrier, and associate the throughput contributions with the set of carriers in the record. Moreover, the UE can also store information related to a timing window for receiving the timing advance command for each of the set of carriers. For example, based on the timeAlignmentTimer command, the UE can determine a timestamp (e.g., a subframe number) before which the UE expects to receive a new timing advance command for each of the set of carriers, and store the timestamp information in the record. Table 400 of FIG. 4 illustrates an example of such a record.

Based on a scheduled time for receiving a PRS signal (e.g., according to the Assistance Data from location server 140 of FIG. 1), and the information stored in table 400, a UE can perform a selection process to select a carrier for tune away. In one example, the UE may select a carrier for which the timing advance command is expected to arrive before the arrival of the PRS signal (and the tune away period), such that the UE will not lose the opportunity to receiving the timing advance command during the tune away period. In the example of FIG. 4, based on the information that the PRS is scheduled to come at subframe 200 ("sf 200"), whereas for carrier frequency band f-0 the timing advance command is expected to arrive before subframe 100 ("sf 100") and precedes subframe 200, the UE may select carrier frequency band f-0 for tune away. On the other hand, carrier frequency bands f-1 and f-2 are not selected because there is overlap between the timing window for receiving the PRS signal and the timing window for receiving the timing advance command for each of the carrier frequency bands. For example, for both of frequency bands f-1 and f-2, the timing advance command is expected to arrive any time before sf 250, which is after the scheduled time for receiving the PRS signal (sf 200), meaning that there is a likelihood that the timing advance command may come during the tune away period if either frequency bands f-1 or f-2 is selected for tune away.

In another example, if all of the carrier frequency bands listed in table 400 have overlap between the timing window for receiving PRS signal and the timing window for receiving the timing advance command, the UE may select a carrier based on the throughput contribution associated with each of these carriers, to minimize throughput degradation. In the example of FIG. 4, assuming that the carrier of frequency band f-0 cannot be selected for tune away, the UE may instead select the carrier of frequency band f-1 due to its smaller throughput contribution than carrier of frequency band f-2. Similarly, if none of the carrier frequency bands listed in table 400 have the timing window for receiving the PRS signal overlapping with and the timing window for receiving the timing advance command, the UE may select the carrier of the smallest throughput contribution for tune away.

Figure 5:
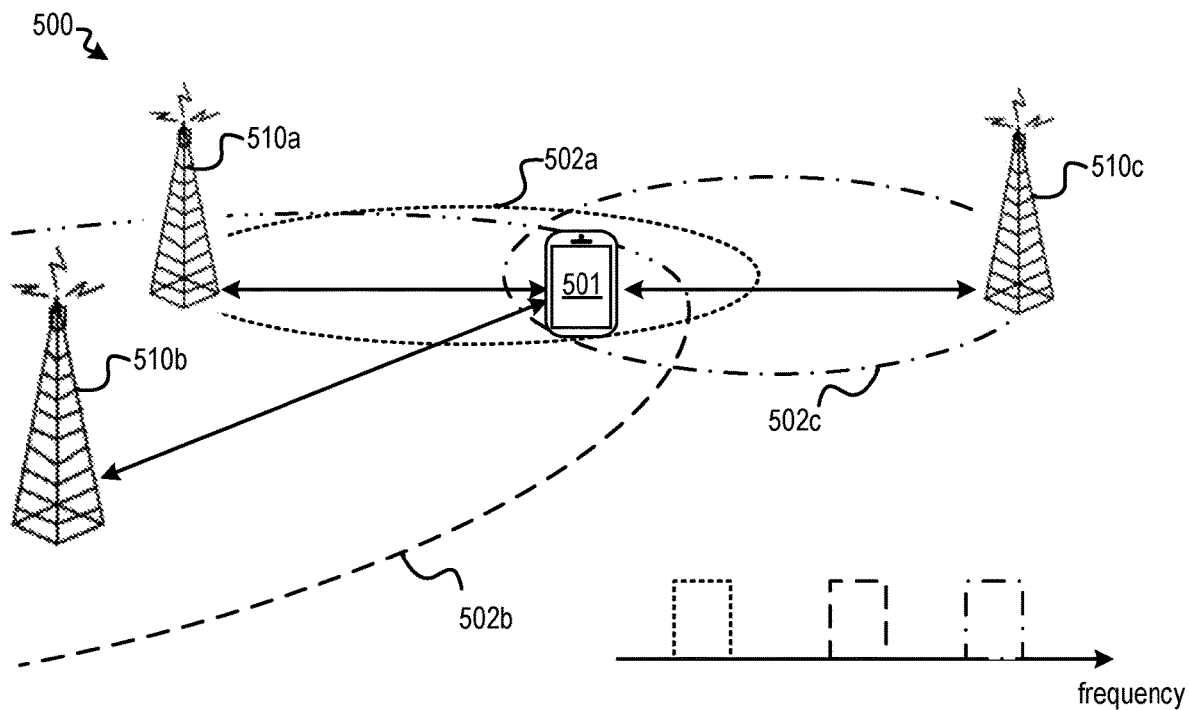
FIG. 5 illustrate another examples of wireless communication involving timing adjustments.
Figure 5:
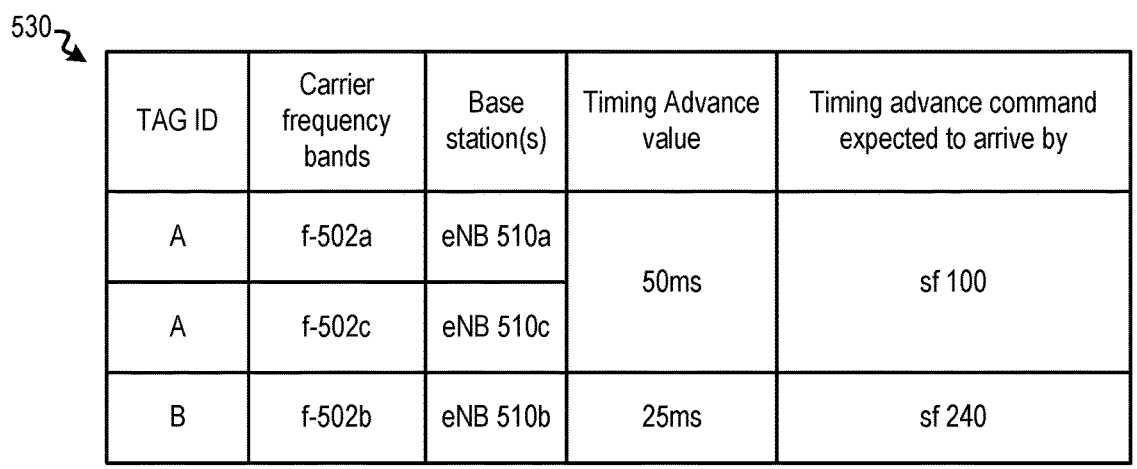
Figure 5:
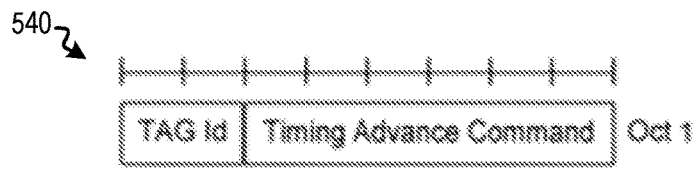

In some embodiments, the UE may select the carrier based on other criteria. In one example, multiple serving cells that are in communication with a particular UE can be grouped into one or more timing advance groups (TAGs). Each cell (and the associated eNB) within a TAG may have the same distance from the UE. Therefore, the UE can apply the same timing advance information to the transmission of uplink data to each of these cells. Reference is now made to FIG. 5, which illustrates the formation of TAGs. Referring to diagram 500, UE 501 may be in communication with eNBs 510*a*, 510*b*, and 510*c*, each of which is associated with, respectively, a cell 502*a*, a cell 502*b*, and a cell 502*c*. The cells may be associated with carriers of different frequency bands. In the example of diagram 500, eNBs 510*a* and 510*c* may be of equal distance from UE 501, while eNB 510*c* is further away. The base stations eNBs 510*a*, 510*b*, and 510*c* can estimate the distance from UE 501 based on uplink data timing, and can determine that eNBs 510*a* and 510*c* can be grouped into one TAG (TAG group A), and eNB 510*b* can be grouped into another TAG (TAG group B). Each TAG can be associated with an identifier (TAG ID). The base stations can transmit the information about the TAG grouping to UE 501, which can then store the mapping of the TAG to the base stations and the carrier frequency bands associated with the base stations. Table 530 illustrates an example of such a record, with TAG group identifiers ("A" and "B") being associated with the carrier frequencies of the serving cells of each TAG group (e.g., f-502*a* being the carrier frequency band of cell 502*a*, f-502*b* being the carrier frequency band of cell 502*b*, f-502*c* being the carrier frequency band of cell 502*c*, etc.). Table 530 also stores the timing advance information for each TAG, as well as the timing information for receiving the timing advance information, also for each TAG.

To update the timing advance information, one or more of the serving cells within the TAG can transmit a timing advance command associated with that TAG. Diagram 540 illustrates an example of the timing advance command. As shown in diagram 540, the timing advance command includes a field for TAG ID (TAG identifier), and the timing advance information. After UE 501 receives the timing advance command, it can refer to the TAG ID and update and/or store the timing advance value associated with a particular TAG based on the TAG ID in table 530. The timing advance command can also be generated by the MAC CE, and can be transmitted as part of downlink communication. UE 501 may also receive a timeAlignmentTimer command from any one of the eNBs of the TAG, and update and/store the timing information for receiving the timing advance command in table 530.

As discussed above, UE 501 may receive a timing advance command from any of the carriers within the TAG, and that UE 501 updates the timing advance information for that TAG based on the received timing advance command. If one of the carriers within the TAG is to receive the timing advance command on behalf of the TAG but fails to do so because, for example, the carrier is selected for tune away, the entire set of carriers within that TAG may be affected. As a result, the UE may use stale timing advance information for each of the carriers within the TAG. This can result in improper synchronization of uplink transmission for each of the carriers, and degrade the data throughput for each of these carriers.

In some embodiments, to mitigate the degradation of data throughput due to the tune away process, a UE can maintain a record of the accumulative data throughput for each TAG (based on the data throughput contribution of the set carriers included in each TAG), and perform a selection process to select a carrier for tune away based on the information in the record. Reference is now made to FIG. 6, which illustrates an example of table 600 representing such a record. As shown in FIG. 6, the UE can map the TAG IDs with the carrier frequencies, with the timing window for receiving the timing advance command, and with the throughput contribution information.

Based on a scheduled time for receiving a PRS signal (e.g., according to the Assistance Data from location server 140 of FIG. 1), and the information stored in table 600, a UE can perform a selection process to select a carrier for tune away. In one example, the UE may select a carrier from a TAG for which the timing advance command is expected to arrive before the arrival of the PRS signal (and the tune away period), such that the UE will not lose the opportunity to receive the timing advance command for that TAG during the tune away period. In the example of FIG. 6, based on the information that the PRS is scheduled to come at subframe 200 ("sf 200"), whereas for TAG group A the timing advance command is expected to arrive by subframe 100 ("sf 100") and precedes subframe 200, the UE may select TAG group A to identify a set of candidate carriers for tune away. From TAG group A, the UE can select a carrier that contributes the lowest data throughput among the set of carriers within TAG group A for tune away. In the example of FIG. 6, the UE may select the carrier with frequency band f-502c for tune away, because the frequency band f-502c has a lowest throughput contribution (10%) among the throughput contributions of each carrier within TAG group A. For example, another carrier of TAG group A (f-502a) has a higher throughput contribution (70%) than the that of frequency band f-502c.

In another example, in a case where all TAGs listed in table 600 have overlap between the timing window for receiving PRS signal and the timing window for receiving the timing advance command, the UE may select the TAG with the lowest accumulative throughput contribution. For example, assuming that both TAG group A and TAG group B have overlap between the timing window for receiving PRS signal and the timing window for receiving the timing advance command, the UE may select TAG group B (and a carrier from the group) for tune-way, based on the throughput contribution of TAG group B (20%) being lower than the throughput contribution of TAG group A (80%).

Figure 7:
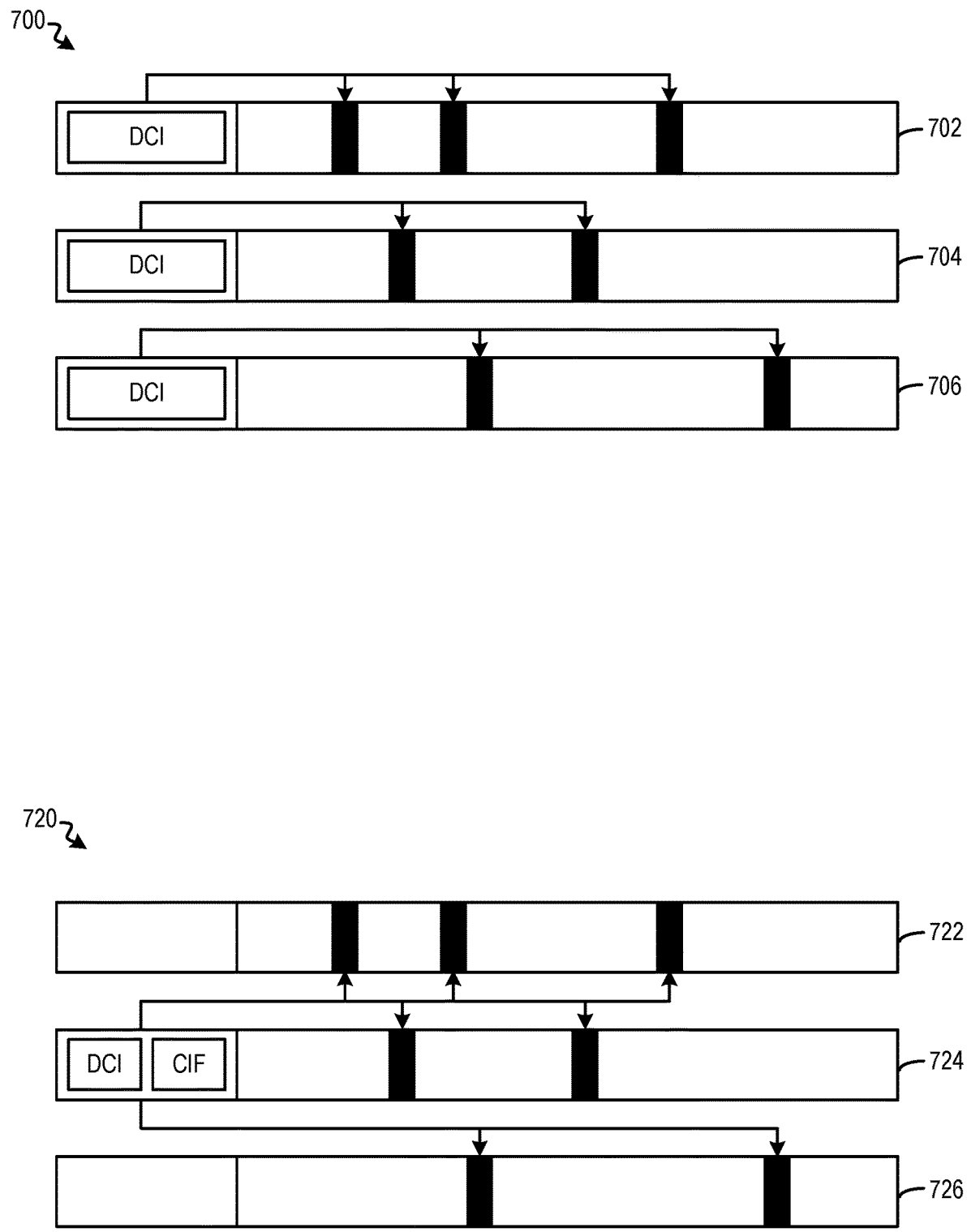
FIG. 7 illustrates examples of wireless communication involving carrier scheduling.

Besides timing advance information, the aforementioned configuration information may also include resource block allocation information. As discussed above, the resource blocks can be allocated to multiple UEs, which in turn determines the timing (e.g., using which slot, subframe, frame, etc.) for the UEs to transmit and receive information. The PDCCH of a subframe may include Downlink Control Information (DCI) which sets which of the resource blocks within a subframe is allocated to a particular user. Reference is now made to FIG. 7, which includes different implementations of DCI. Diagram 700 of FIG. 7 illustrates three subframes 702, 704, and 706, which can be associated with carriers of different frequency bands. In the example of FIG. 7, each of subframes 702, 704, and 706 include DCI in the PDCCH region. The DCI sets the resource blocks allocated to a particular user, which in turn schedules the slots of each subframe (denoted by the dark strips) allocated to the user.

Diagram 720 illustrates an example of cross-carrier scheduling, which can be another example of resource block allocation. Under the carrier aggregation scheme, a UE can receive PDCCH on one of the component carriers to eliminate inter-cell interference on the PDCCH. The received PDCCH may include scheduling information (e.g., resource allocation information) for the component carrier that carries the PDCCH, as well as for other component carriers that do not carry the PDCCH. Under the carrier aggregation scheme, the primary component carrier (PCC) can be the carrier that carries the PDCCH and cross-carrier scheduling information. The secondary component carrier (SCC) cannot include cross-carrier scheduling information that schedules the resources of a PCC.

Diagram 720 illustrates an example of cross-carrier scheduling. Diagram 720 illustrates three subframes 722, 724, and 726, each of which is associated with a component carrier that can be accessible to a UE under the carrier aggregation scheme. Subframe 724 can be associated with a PCC, while subframes 722 and 726 can be associated with two SCCs. In diagram 720, subframe 724 may carry PDCCH, which includes the DCI information and a Carrier Indicator Field (CIF) to indicate that the DCI of subframe 724 includes the scheduling information for subframes 722 and 726. When the UE receives subframe 724, it can use the scheduling information included in the DCI of subframe 724 to transmit/receive data using the carriers associated with subframes 722 and 726. The component carriers associated with subframes 722, 724, and 726 can form a cross-carrier scheduling (CCS) group, with the carrier of subframe 724 724 (which carries the cross-carrier scheduling information) being designated as a parent carrier of the group. In a case where cross-carrier scheduling is used in a wireless communication network associated with LTE release 14 or lower, the parent carrier may include the DCI in every subframe being transmitted. In a case where cross-carrier scheduling is used in a wireless communication network associated with 5G New Radio (5G NR), the parent carrier may be scheduled to transmit the DCI in certain subframes by a base station. A UE may receive the scheduled time of transmission of the DCI (e.g., based on a system frame number and subframe offsets) from the base station via various ways including, for example, via the Random Access Channel Procedure (RACH), a dedicated communication channel established as part of the downlink communication, etc.

If a parent carrier that carries the DCI information is selected for tune away, and that the tune-way period (the subframes) overlaps with the subframes of the PDCCH of the parent carrier, the parent carrier may not be able to receive the scheduling information from the base station. As a result, the UE may be unable to receive the resource allocation information for each of the carriers within that particular cross-carrier scheduling group, and cannot use those carriers for data transmission/reception. Accordingly, the data throughput contributed by these carriers may be lost as well.

Figure 8:
FIG. 8 illustrates an example of data records created to facilitate the wireless communications illustrated in FIG. 7.

In some embodiments, to mitigate the degradation of data throughput due to the tune away process, a UE can maintain a record of the accumulative data throughput for each cross-carrier scheduling group (based on the data throughput contribution of the set carriers included in each group), and perform a selection process to select a carrier for tune away based on the information in the record. Reference is now made to FIG. 8, which illustrates an example of table 800 representing such a record. As shown in FIG. 8, the UE can store the cross-carrier scheduling group information for each component carrier. In the example of FIG. 8, carrier frequency bands f-722, f-724, and f-726 (associated with, respectively, subframes 722, 724, and 726 of FIG. 7) are grouped under the CCS group A. Table 800 also indicate that f-724 is the parent carrier which carries the cross-carrier scheduling information. Table 800 also stores the throughput contribution for each component carrier in the group. Further, table 800 also stores a component carrier (of frequency band f-802) that is not part of any CCS group, and which does not carry cross-carrier scheduling information.

Optionally (e.g., for 5G NR), table 800 further includes the subframe number of the upcoming DCI transmission. In the example of FIG. 8, table 800 include that carrier frequency bands f-724 is scheduled to carry the DCI information at subframe sf 200 (of subframes 724).

Based on the information stored in table 800, a UE can perform a selection process to select a carrier for tune away. In one example, the UE may preferentially select a carrier that is not associated with any CCS group, such as the carrier of frequency band f-802, for tune away, based on a determination that the carrier does not carry cross-carrier scheduling information, and that selecting that carrier for tune away will not affect the resource allocation of other carriers.

In another example, in a case where all the carriers listed in table 800 are associated with CCS groups, and that the parent carriers for these CCS groups include DCI information in every subframe (hence overlap between the PRS occasions and the DCI transmission is certain), the UE may select a CCS group with the lowest accumulative throughput (based on the throughputs of the set of carriers included in the group) among the CCS groups. Within that CCS group, the UE will exclude the parent carrier, and select a carrier (without cross-carrier scheduling information) that provides the lowest throughput contribution to the CCS group. In the example of FIG. 8, the UE may select the carrier of frequency band f-726 for tune away, because the throughput contribution of frequency band f-726 (20%) is the lowest among the set of carriers of CCS group A, excluding frequency band f-724 which is the parent carrier.

In yet another example, in a case where all the carriers listed in table 800 are associated with CCS groups, and that the scheduled transmissions of the DCI for a parent carrier of at least one CCS groups does not overlap with the PRS occasions, a carrier that provides the lowest throughput contribution among the carriers in the at least one CCS group can be selected for tune away. On the other hand, if the parent carrier for every CCS group has overlap between scheduled DCI transmissions and PRS occasions, the CCS group with the lowest accumulative throughputs among the CCS groups can be identified, and a carrier with lowest throughput contribution to the identified CCS group can be selected for tune away.

In some embodiments, a UE can be configured to select a carrier for tune away based on any combinations of the techniques disclosed in FIG. 4, FIG. 5, FIG. 6, FIG. 7, and FIG. 8. For example, the UE may select a carrier based on the TAG information, the CCS information, or a combination of both.

In some embodiments, a base station may also update certain carrier configuration to facilitate the carrier selection process at the UE. For example, as discussed above, under the carrier aggregation scheme a number of base stations may provide a set of component frequencies to a UE. Based on the locations of the base stations, as well as the estimated propagation time between the UE and the base stations, the base stations can estimate which of the carriers are grouped under a particular TAG at the UE. The base stations can then select a carrier (and a base station to provide that carrier), and provide that carrier to the UE for carrier aggregation, with the assumption that this carrier will not be part of the TAG. As discussed above, it may be preferable to not select a carrier associated with a TAG for tune away, for the possibility that this carrier may be used to transmit timing advance information for the TAG, and using that carrier for tune away may affect the acquisition of timing advance information for the entire TAG. Here, by providing the UE a carrier that is unlikely to be associated with a TAG, the UE can be provided with more (and better) choices of carriers for tune away. As another example, a base station may also provide a carrier that is not associated with any CCS group to the UE for carrier aggregation, so that the UE can select that carrier, instead of other carriers associated with a CCS group, for tune away.

With the disclosed techniques, a UE can select a carrier for tune away based on a property of the data lost with that carrier during the tune-way process. The UE can estimate an effect on the performance of the UE (e.g., data throughput degradation) based on the property of the data, and based on the estimation, determine whether to select that carrier for tune away. With such arrangements, the degradation to the performance of the UE caused by the tune away process can be mitigated.

Figure 9:
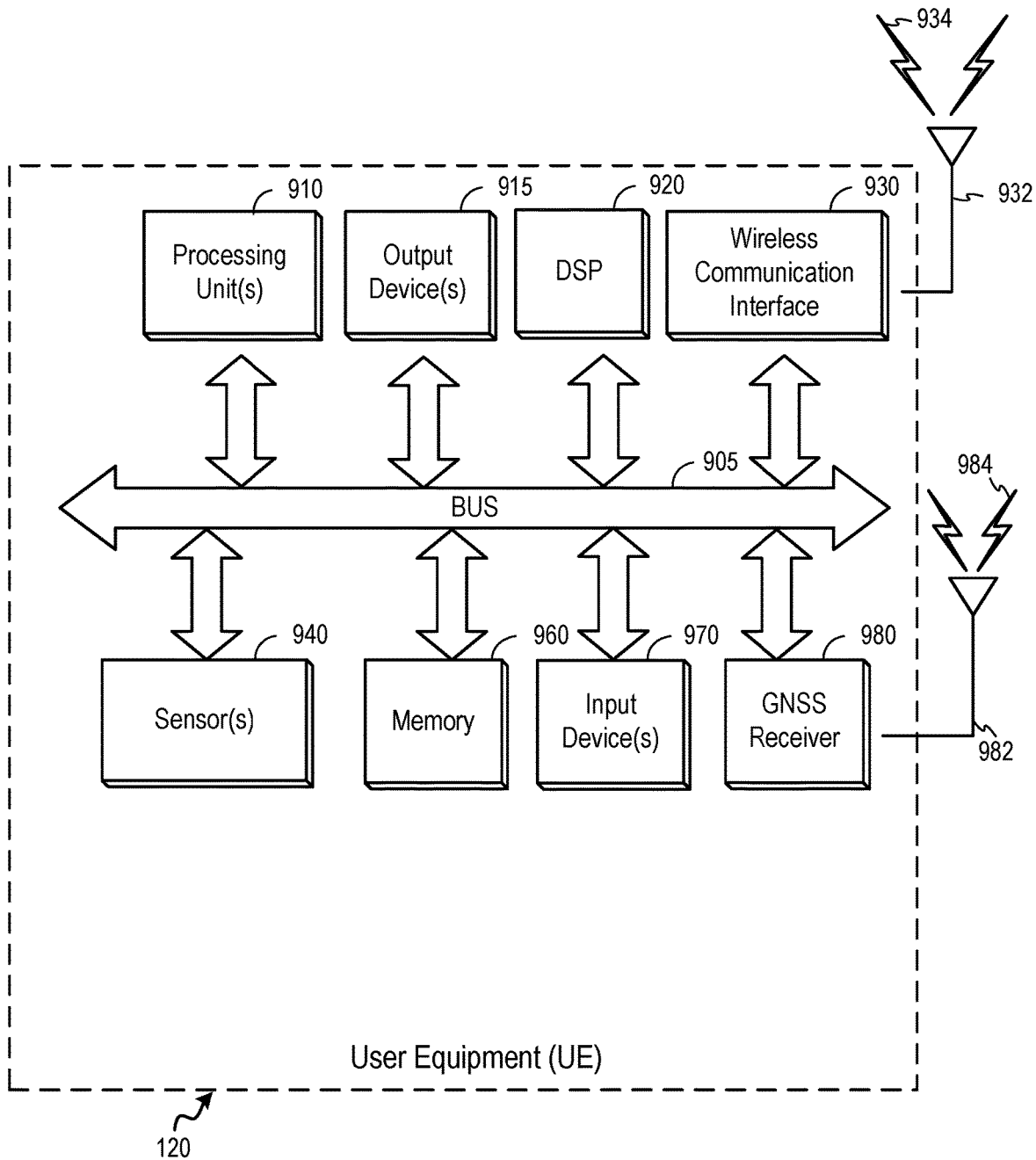
FIG. 9 shows a block diagram of a UE and a base station.

FIG. 9 shows a block diagram of UE 120 of FIG. 1. FIG. 9 is meant only to provide a generalized illustration of various components, any or all of which may be included or omitted in a particular type of device as appropriate. It can be noted that, in some instances, components illustrated by FIG. 9 can be localized to a single physical device and/or distributed among various networked devices, which may be disposed at different physical locations. UE 120 may be configured to execute one or more functions of the methods described herein.

UE 120 is shown comprising hardware elements that can be electrically coupled via a bus 905 (or may otherwise be in communication, as appropriate). The hardware elements may include a processing unit(s) 910 which may comprise without limitation one or more general-purpose processors, one or more special-purpose processors (such as digital signal processing (DSP) chips, graphics acceleration processors, application specific integrated circuits (ASICs), and/or the like), and/or other processing structure or means, which can be configured to perform one or more of the methods described herein. As shown in FIG. 9, some embodiments may have a separate DSP 920, depending on desired functionality. The UE 105 also may comprise one or more input devices 970, which may comprise without limitation one or more touch screens, touch pads, microphones, buttons, dials, switches, and/or the like, which may provide for user input, for example. Output devices 915 may comprise, without limitation, one or more displays, light emitting diode (LED)s, speakers, and/or the like.

UE 120 may also include a wireless communication interface 930, which may comprise without limitation a modem, a network card, an infrared communication device, a wireless communication device, and/or a chipset enabling communications using, for example, Bluetooth®, Bluetooth® Low Energy (BLE), IEEE 802.11, IEEE 802.15.4 (ZIGBEE®), Wi-Fi, a WiMAX™ device, cellular communication, and/or the like. Wireless communication interface 930 also support various wireless wide area network (WWAN) technologies including, for example, may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement GSM, Digital Advanced Mobile Phone System (D-AMPS), or some other RAT. An OFDMA network may employ LTE, LTE Advanced, and so on. LTE, LTE Advanced, GSM, and W-CDMA are described in documents from 3GPP. Cdma2000 is described in documents from a consortium named "3rd Generation Partnership Project 2" (3GPP2). 3GPP and 3GPP2 documents are publicly available. Wireless communication interface 930 may also support, for example, 5G network, 5G New Radio, etc. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

Wireless communication interface 930 may permit data to be communicated with a network, computer system, and/or any other electronic device as described herein. The communication can be carried out via one or more wireless communication antenna(s) 932 that send and/or receive wireless signals 934.

Depending on desired functionality, the wireless communication interface 930 may comprise separate wireless transceivers to communicate with different devices, which may be on different networks. These different data networks may comprise various network types. A UE 120 can further include sensor(s) 940, which may vary depending on the type of computing device. Such sensors may comprise, without limitation, accelerometer(s), gyroscope(s), cameras, magnetometers and/or other compasses, altimeters, microphones, proximity sensors, light sensors, and the like. In some embodiments, information acquired by the sensor(s) 940 may be used for location determination of UE 120.

Embodiments of UE 120 may also include a GNSS receiver 980 capable of receiving signals 984 from one or more GNSS satellite vehicles using an GNSS antenna 982. Such positioning can be utilized to complement and/or incorporate the techniques described herein. GNSS receiver 980 can extract a position of UE 120, using conventional techniques, from GNSS satellite vehicles (SVs) of an GNSS system, such as Global Positioning System (GPS), Galileo, Global Navigation Satellite System (GLONASS), Compass, Quasi-Zenith Satellite System (QZSS) over Japan, Indian Regional Navigational Satellite System (IRNSS) over India, Beidou over China, and/or any other satellite positioning system (SPS). Moreover, GNSS receiver 980 can be used various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an GNSS may include any combination of one or more global and/or regional navigation satellite systems and/or augmentation systems, and GNSS signals may include GNSS, GNSS-like, and/or other signals associated with such one or more GNSSes.

UE 120 may further include and/or be in communication with a memory 960. Memory 960 may comprise, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like. Memory 960 may be used to store the images (or frames) captured by the forward-facing camera as described herein.

Memory 960 of the UE 120 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the functionality discussed above might be implemented as computer code and/or instructions executable by UE 120 (and/or processing unit(s) 910 within UE 120). In an aspect, then, such code and/or instructions can be used to configure and/or adapt a general purpose computer (or other device) to perform one or more operations in accordance with the described methods. Memory 960 may therefore comprise non-transitory machine-readable media having the instructions and/or computer code embedded therein/thereon. Common forms of computer-readable media include, for example, magnetic or optical media, a RAM, a PROM, EPROM, a FLASH-EPROM, any other memory chip or cartridge, a carrier wave as described hereinafter, or any other medium from which a computer can read instructions and/or code.

Some of the blocks of FIG. 9 (e.g., processing unit 910, wireless communication interface 930, memory 960, etc.) can also be part of other components of an LTE network, illustrating LPP message encapsulation, according to an embodiment. Here, components not only include a UE and LS (e.g., E-SMLC), but various other related components such as an e-NodeB (e.g., eNB 110*a*, 110*b*, 110*c* of FIG. 1), mobility management entity (MME) (e.g., part of network controller 130 of FIG. 1), gateway mobile location center (GMLC), and LCS Client, the functionality of which will be appreciated by a person of ordinary skill in the art.

Figure 10:
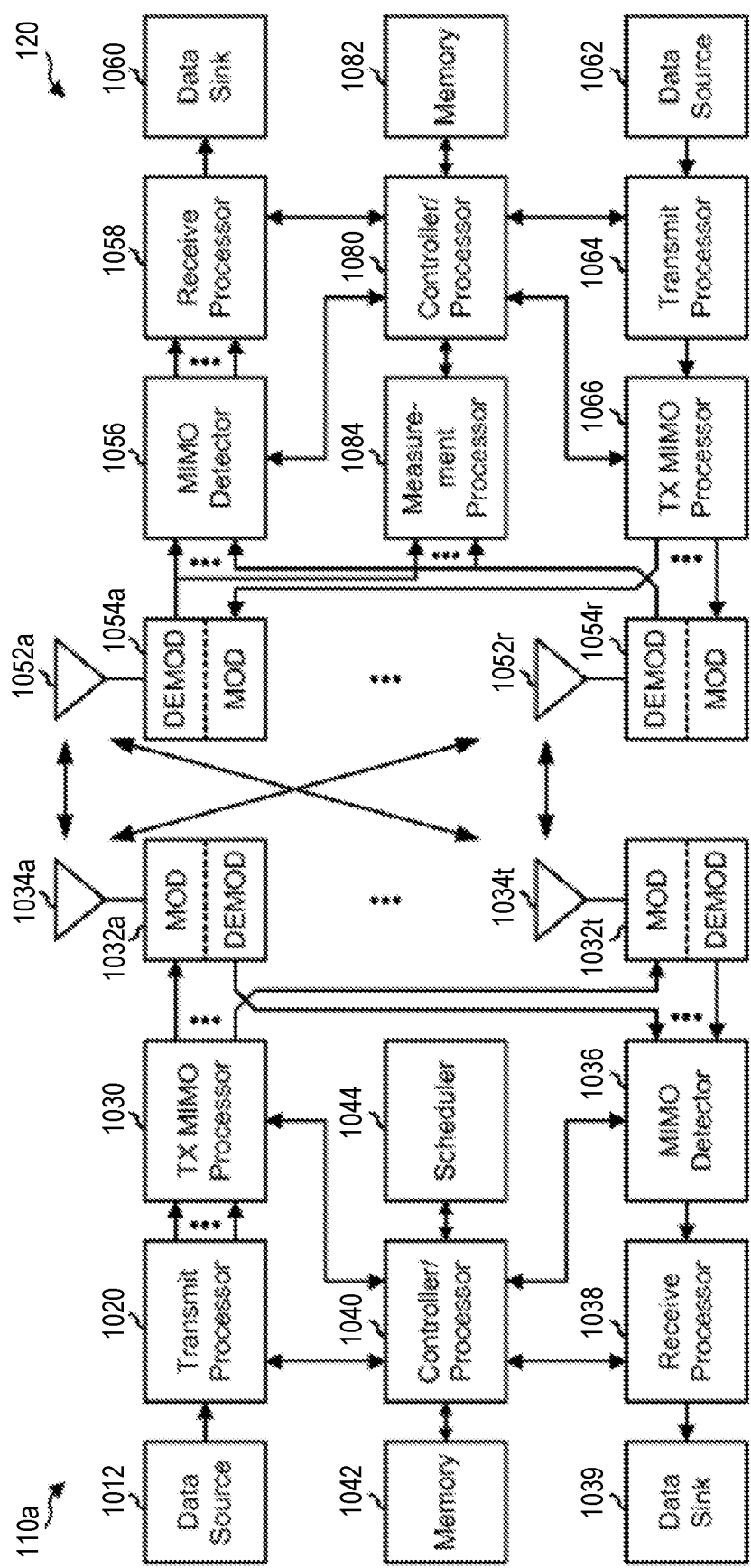
FIG. 10 shows another block diagram of a UE and a base station.

FIG. 10 shows a block diagram of a design of a base station/eNB 110*a* and a UE 120 of FIG. 1. Base station 110*a* may serve one or more cells and may be equipped with one or more antennas 1034*a* through 1034*t*. UE 120 may also be equipped with one or more antennas 1052*a* through 1052*r*. Some details of the blocks in FIG. 10 are illustrated in FIG. 9 and are not repeated here.

At base station 110*a*, a transmit processor 1020 may receive data from a data source 1012 for one or more UEs scheduled for data transmission, process (e.g., encode and modulate) the data for each UE based on one or more modulation and coding schemes selected for that UE, and provide data symbols for all UEs. Transmit processor 1020 may also process control information (e.g., for scheduling grants, messages carrying measurement gap patterns, etc.) and provide control symbols. Transmit processor 1020 may also generate reference symbols for CRS, PRS, and/or other reference signals. A transmit (TX) multiple-input multiple-output (MIMO) processor 1030 may precode the data symbols, the control symbols, and/or the reference symbols (if applicable) and may provide a number of output symbol streams to a number of corresponding modulators (MOD) 1032*a* through 1032*t*. Each modulator 1032 may process its output symbol stream (e.g., for OFDM, etc.) to obtain an output sample stream. Each modulator 1032 may further condition (e.g., convert to analog, amplify, filter, and up-convert) its output sample stream to obtain a downlink signal. Downlink signals from modulators 1032*a* through 1032*t* may be transmitted via the one or more antennas 1034*a* through 1034*t*, respectively.

At UE 120, antennas 1052*a* through 1052*r* may receive the downlink signals from base station 110*a* and/or other base stations and may provide received signals to demodulators (DEMODs) 1054*a* through 1054*r*, respectively. Each demodulator 1054 may condition (e.g., filter, amplify, down-convert, and digitize) the received signal to obtain input samples. Each demodulator 1054 may further process the input samples (e.g., for OFDM, etc.) to obtain received symbols. A MIMO detector 1056 may obtain received symbols from all demodulators of mod/demodulators 1054a through 1054r, perform MIMO detection on the received symbols, and provide detected symbols. A receive processor 1058 may process (e.g., demodulate and decode) the detected symbols, provide decoded data for UE 120 to a data sink 1060, and provide decoded control information to a controller/processor 1080. A measurement processor 1084 may make measurements of cells visible to UE 120, e.g., during idle periods indicated by a measurement gap pattern for UE 120.

In some cases, as discussed above, controller/processor 1080 may determine a carrier to be idled for tune away during those idle periods based on the scheduled time of transmission of PRS signal and the timing window for receiving timing advance command for that carrier, as discussed above. In some cases, controller/processor 1080 may determine a tune away carrier to be idled for tune away during those idle periods based on whether that carrier includes cross-carrier scheduling information, as discussed above. During the idle periods, controller/processor 1080 may control the demodulation operations at receive processor 1058 to, for example, tune away from the tune away carrier to obtain the reference signals (e.g., PRS signals), and provide the reference signals to measurement processor 1084. At the end of the idle periods, controller/processor 1080 may instruct control the demodulation operations at receive processor 1058 to tune back to the tune away carrier to resume reception of other downlink data (or to resume transmission of uplink data). A memory 1082 may store data and program codes for UE 120 (e.g., executed by controller/processor 1080 and/or other processors/modules). Memory 1082 may store data representing, for example, table 400 of FIG. 4, table 530 of FIG. 5, table 600 of FIG. 6, table 800 of FIG. 8, etc., and provide the data to controller/processor 1080 for carrier selection.

On the uplink, at UE 120, a transmit processor 1064 may receive and process data from a data source 1062 and control information (e.g., timing information, requests for measurement gaps, etc.) from controller/processor 1080. Transmit processor 1064 may also generate reference symbols for one or more reference signals. The symbols from transmit processor 1064 may be precoded by a TX MIMO processor 1066 if applicable, further processed by the modulators of mod/demodulators 1054a through 1054r (e.g., for SC-FDM, OFDM, etc.), and transmitted to base station 110a. At base station 110a, the uplink signals from UE 120 and other UEs may be received by antennas 1034, processed by demodulators 1032, detected by a MIMO detector 1036 if applicable, and further processed by a receive processor 1038 to obtain decoded data and control information sent by UE 120. Processor 1038 may provide the decoded data to a data sink 1039 and the decoded control information and timing information for cells to controller/processor 1040.

Controllers/processors 1040 may direct the operation at base station 110, and may perform examples of the disclosed techniques for wireless communication. For example, controllers/processors 1040 may select a component carrier that is less likely to be tuned away (e.g., a carrier that does not belong to a timing advance group (TAG), a cross-carrier scheduling (CCS) group, etc., and provide the component carrier for carrier aggregation at UE 120. Memories 1042 may store data and program codes for base station 110a (e.g., executed by controller/processor 1040 and/or other processors/modules). A scheduler 1044 may schedule UEs for data transmission on the downlink and/or uplink.

Figure 11:
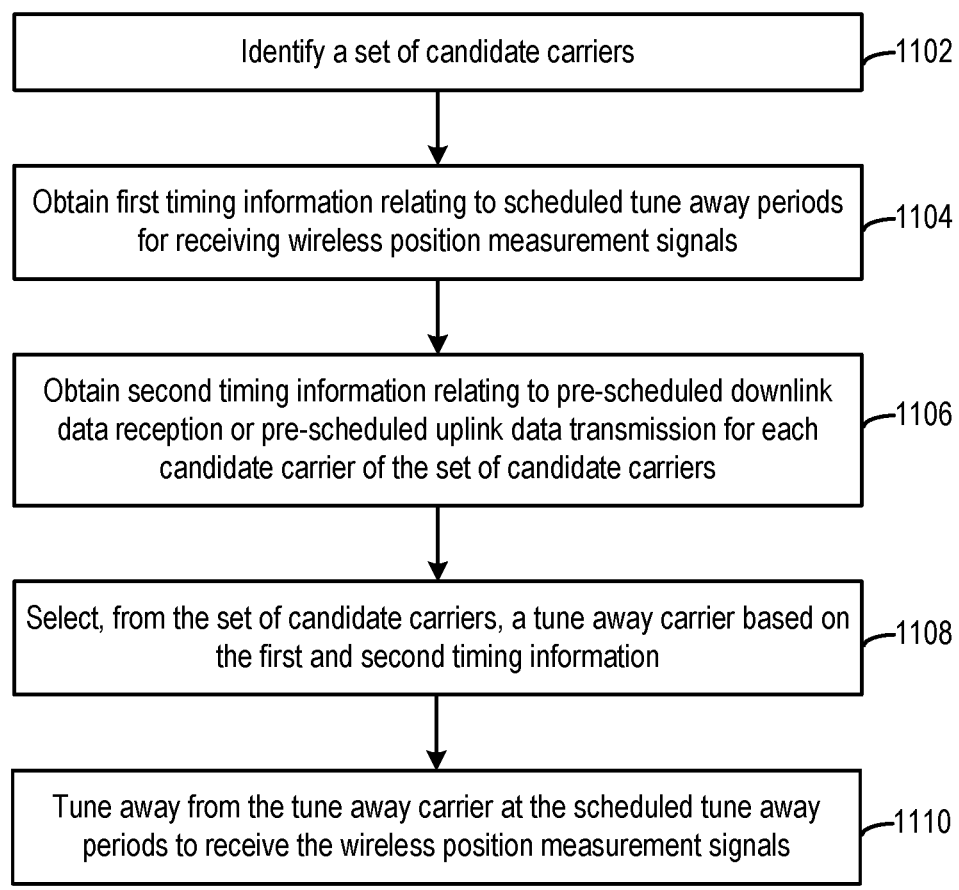
FIGS. 11, 12, 13A, 13B, 14, and 15 illustrate examples of processes of wireless communication.

FIG. 11 shows a process 1100 for performing wireless communication. Process 1100 may be performed by a UE (e.g., UE 120). At block 1102, the UE may identify a set of candidate carriers. The set of candidate carriers may be associated with at least one of: downlink data reception, uplink data transmission, or any combination thereof. The set of candidate carriers may be used by the UE to perform data communication (e.g., downlink data reception, uplink data transmission) with one or more base stations using a carrier-aggregation scheme.

Means for performing the function at block 1102 can include, for example, processing unit(s) 910, bus 905, memory 960, wireless communication interface 930, and/or other components of a UE 120 as illustrated in FIG. 9, as well as controller/processor 1080 of FIG. 10. For example, the UE may obtain information about the set of candidate carriers from the set of carriers that are tuned to by the transceivers of wireless communication interface 930 for downlink data reception and/or uplink data transmission.

At block 1104, the UE may obtain first timing information relating to one or more pre-scheduled tune away periods for receiving wireless position measurement signals (e.g., PRS). The first timing information may be obtained from, for example, Assistance Data from a location server.

Means for performing the function at block 1104 can include, for example, processing unit(s) 910, wireless communication interface 930, bus 905, memory 960, and/or other components of a UE 120 as illustrated in FIG. 9, as well as controller/processor 1080 of FIG. 10. For example, processing unit(s) 910 may receive the first timing information from a location server via wireless communication interface 930.

At block 1106, the UE may obtain second timing information relating to pre-scheduled downlink data reception or pre-scheduled uplink data transmission for each candidate carrier of the set of candidate carriers. The pre-scheduled downlink data reception and uplink data transmission may include, for example, receiving a timing advance command, receiving resource block allocation information for multiple carriers, transmission of any other data, etc. The second timing information may include, for example, a pre-scheduled window for receiving the timing advance command, a pre-scheduled window for receiving resource block allocation information, etc. In some embodiments, the UE may obtain, as part of the second timing information, a timer from a command (e.g., a timeAlignmentTimer command) which may include a series of timestamps representing pre-scheduled timing windows for receiving the timing advance commands. In some embodiments, the first timing information and the second timing information may be represented based on subframe positions (e.g., in terms of system frame number and subframe offset, etc.) in the uplink data transmission or the downlink data reception.

Means for performing the function at block 1106 can include, for example, processing unit(s) 910, wireless communication interface 930, bus 905, memory 960, and/or other components of a UE 120 as illustrated in FIG. 9, as well as controller/processor 1080 of FIG. 10. For example, processing unit(s) 910 may receive the timing advance command timing window from table 400 (of FIG. 4) and table 530 (of FIG. 5), both of which can be stored in memory 960. The timing advance command timing window information may be previously received via wireless communication interface 930 and stored in memory 960.

At block 1108, the UE may select, from the set of candidate carriers, a carrier for tune-way based on the first timing information and the second timing information. In one example, the UE may determine whether there is at least one carrier, from the set of candidate carriers, for which there is no overlap between the pre-scheduled tune away periods and the pre-scheduled timing window (e.g., for receiving the timing advance information, for receiving the resource allocation information, etc.) as indicated by the second timing information. If the UE determines that there is at least at least one carrier for which there is no overlap, the UE may select the carrier from the at least one carrier for tune away. The tune away carrier may be selected based on, for example, being associated with a lowest throughput among the at least one carrier, or based on other criteria (e.g., being associated with the highest error bit rate, with the worst signal quality, etc.) that affects the throughput of data transmission of the tune away carrier. The throughput determination can be based on, for example, a history of volume of data transmitted/received using the tune away carrier.

In one example, some or all of the candidate carriers are associated with one or more timing advance groups (TAG). As discussed above, for carriers associated with the same TAG (e.g., due to those carriers being associated with uplink and downlink transmissions with base stations at approximately equal distances from the UE), the UE can apply a common timing offset to synchronize the uplink and downlink transmission using those carriers, and may receive the most up-to-date timing offset (in the form of timing advance command) using any of the carriers within the same TAG. If the UE determines that every candidate carrier has an overlap between the pre-scheduled tune away periods and the pre-scheduled timing window, the UE may determine, for example, whether every candidate carrier is associated with a timing advance group (TAG). If there is at least one carrier that is not associated with a TAG, the UE may select the carrier from the at least one carrier not associated with a TAG. The selection of the carrier can also be based on, for example, the carrier being associated with a lowest throughput among the at least one carrier. On the other hand, if every candidate carrier is associated with a TAG, the UE may select a carrier based on the accumulative throughputs of the one or more TAGs associated with the candidate carriers. For example, the UE may determine a throughput for each TAG of the one or more TAGs based on accumulative throughputs of subsets of candidate carriers associated with each TAG. The UE may also determine a first TAG, from the one or more TAGs, that is associated with a lowest accumulative throughput among the one or more TAGs. The UE may then select a carrier from the first TAG for tune away. The carrier may be selected based on, for example, being associated with a lowest throughput among the at least one carrier, or based on other criteria (e.g., being associated with the highest error bit rate, with the worst signal quality, etc.) that affects the throughput of data transmission of the tune away carrier.

In another example, some or all of the candidate carriers are associated with one or more cross-carrier scheduling (CCS) groups. As discussed above, within a CCS group, a parent carrier may include resource allocation scheduling information for other carriers (e.g., DCI, or other cross-carrier scheduling information) of the group. If the UE operates in a wireless communication network associated with, for example, 5G New Radio, the cross-carrier scheduling information may be transmitted in a pre-scheduled timing window. The UE may determine whether there is at least one CCS group with a parent carrier for which there is no overlap between the scheduled tune away period (as indicated by the first timing information) and the pre-scheduled periods for transmission of cross-carrier scheduling information (e.g., DCI) as indicated by the second timing information. If there is at least one CCS group for which there is no overlap, the UE may select a carrier (which may include the parent carrier) from the at least one CCS group for tune away. The selection of the carrier can be based on, for example, the carrier being associated with a lowest throughput among the subset of candidate carriers associated with the at least one CCS group. If every CCS group has an overlap, the UE may determine a first CCS group associated with a lowest accumulative throughput among the CCS groups, and select the carrier from the first CCS group for tune away. In some embodiments, the UE may exclude the parent carrier from the selection. The carrier for tune away may also be selected based on, for example, being associated with a lowest throughput among the subset of candidate carriers of the first CCS group.

Means for performing the function at block 1108 can include, for example, processing unit(s) 910, wireless communication interface 930, bus 905, memory 960, and/or other components of a UE 120 as illustrated in FIG. 9, as well as controller/processor 1080 of FIG. 10. For example, the UE may obtain information about the throughput of different carriers, their association with TAGs and CCS, etc. from table 600 (of FIG. 6) and table 800 (of FIG. 8) stored in memory 960, and select a carrier based on the information.

At block 1110, the UE may tune away from the tune away carrier signals at the scheduled tune way periods to receive the wireless position measurement signals.

Means for performing the function at block 1110 can include, for example, processing unit(s) 910, wireless communication interface 930, bus 905, memory 960, and/or other components of a UE 120 as illustrated in FIG. 9, as well as controller/processor 1080 of FIG. 10. For example, processing unit(s) 910 may receive control wireless communication interface 930 to tune away from the tune away carrier.

Figure 12:
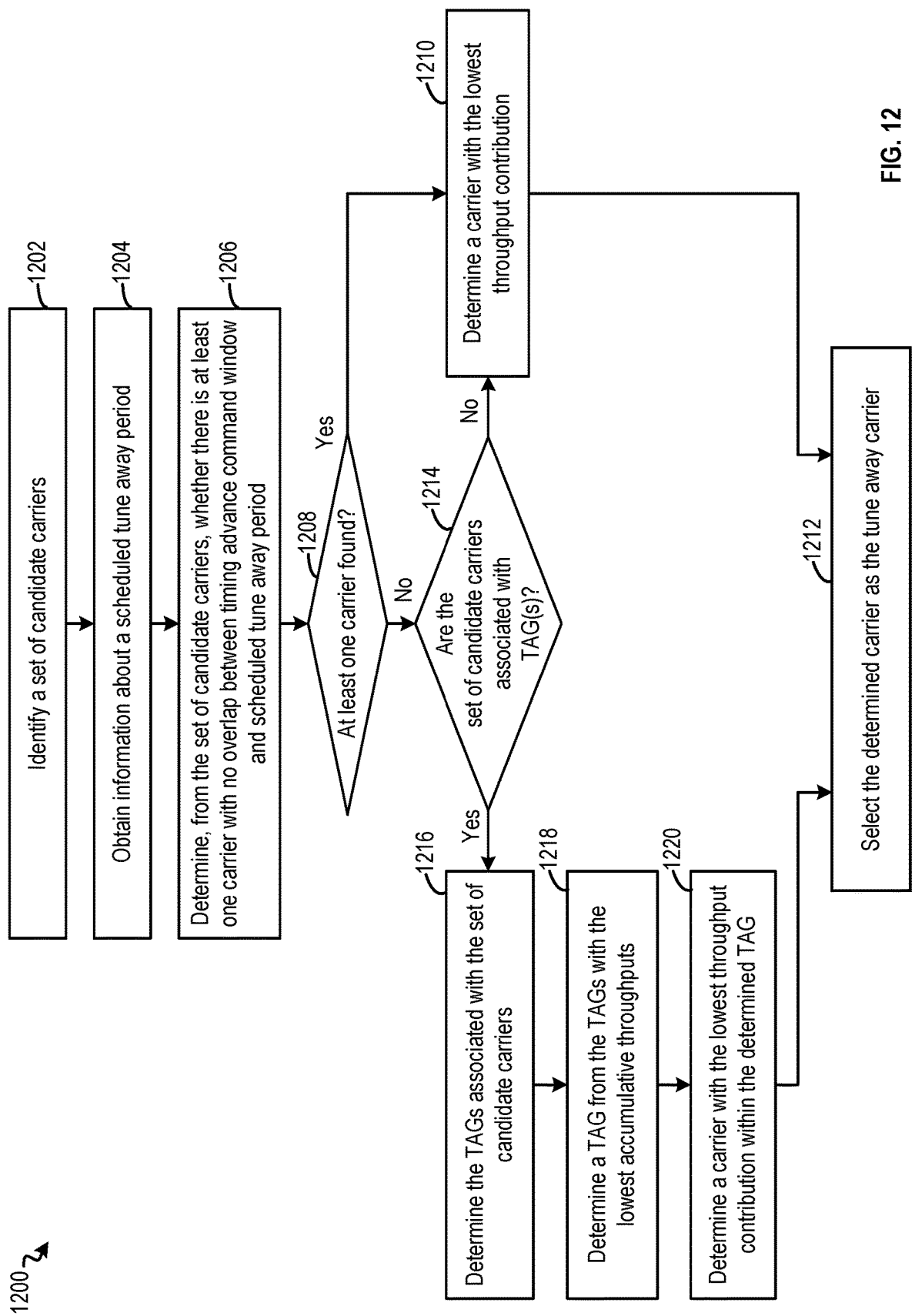

FIG. 12 shows a process 1200 for performing wireless communication. Process 1200 may be performed by a UE (e.g., UE 120) and may be part of process 1100 of FIG. 11. At block 1202, the UE may identify a set of candidate carriers. The set of candidate carriers may include the carriers used by the UE to perform uplink and/or downlink communication with one or more base stations using a carrier-aggregations scheme.

Means for performing the function at block 1202 can include, for example, processing unit(s) 910, wireless communication interface 930, bus 905, memory 960, and/or other components of a UE 120 as illustrated in FIG. 9, as well as controller/processor 1080 of FIG. 10. For example, the UE may obtain information about the set of candidate carriers from the set of carriers that are tuned to by the transceivers of wireless communication interface 930 for downlink data reception and/or uplink data transmission.

At block 1204, the UE may obtain timing information relating to one or more pre-scheduled tune away periods for receiving wireless position measurement signals (e.g., PRS). The timing information may be obtained from, for example, Assistance Data from a location server.

Means for performing the function at block 1204 can include, for example, processing unit(s) 910, wireless communication interface 930, bus 905, memory 960, and/or other components of a UE 120 as illustrated in FIG. 9, as well as controller/processor 1080 of FIG. 10. For example, processing unit(s) 910 may receive the timing information from a location server via wireless communication interface 930.

At block 1206, the UE may determine, from the set of candidate carriers, whether there is at least one carrier with no overlap between a timing window for receiving a timing advance command and the scheduled tune away period. The timing window information can be received based on a timer (e.g., timeAlignmentTimer).

Means for performing the function at block 1206 can include, for example, processing unit(s) 910, wireless communication interface 930, bus 905, memory 960, and/or other components of a UE 120 as illustrated in FIG. 9, as well as controller/processor 1080 of FIG. 10. For example, processing unit(s) 910 may receive the timing window information from a base station (e.g., eNB 110*a*) via wireless communication interface 930.

If at least one of such carriers is found (at block 1208), the UE may determine a carrier with the lowest throughput contribution among the at least one carriers, at block 1210. The determination can be based on information included in, for example, table 530 of FIG. 5 and table 600 of FIG. 6. The UE can then proceed to block 1212 and select the determined carrier for tune away. On the other hand, if all of the set of candidate carriers has overlap between a timing window for receiving a timing advance command and the scheduled tune away period (at block 1208), the UE may further determine whether the set of candidate carriers are associated with any TAG, at block 1214.

If none of the set of carriers is associated with a TAG (at block 1214), the UE may proceed back to blocks 1210 and 1212 to select a carrier based on throughput contribution of that carrier. If the set of candidate carriers is associated with TAGs (at block 1214), the UE may proceed to block 1216 to determine the TAGs associated with each carrier of the set of candidate carriers. The UE then proceed to determine a TAG from the TAGs with the lowest accumulative throughputs (e.g., based on table 530 of FIG. 5, table 600 of FIG. 6, etc.), at block 1218. The UE then proceed to block 1220 to determine a carrier with the lowest throughput contribution within the TAG determined in block 1218. The UE can then proceeds to block 1212 and select the determined carrier for tune away.

Means for performing blocks 1206-1212 can include, for example, processing unit(s) 910, bus 905, memory 960, and/or other components of a UE 120 as illustrated in FIG. 9, as well as controller/processor 1080 of FIG. 10. For example, processing unit(s) 910 may access table 530 of FIG. 5 and table 600 of FIG. 6 stored in memory 960 via bus 905 to obtain the throughput and TAG information, and determine the carrier for tune away based on the information.

Figure 13A:
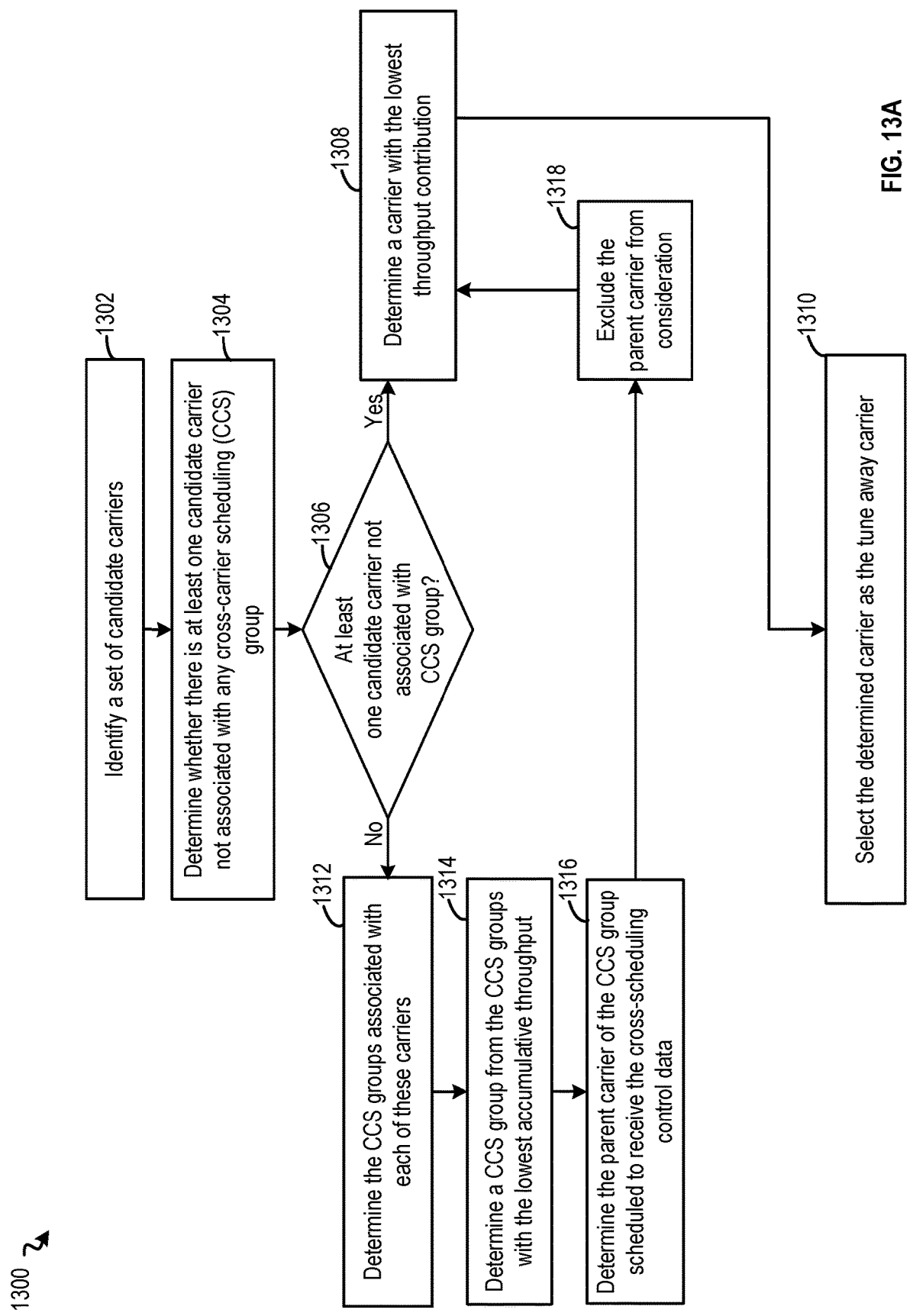

FIG. 13A shows a process 1300 for performing wireless communication. Process 1300 may be performed by a UE (e.g., UE 120). At block 1302, the UE may identify a set of candidate carriers. The set of candidate carriers may include the carriers used by the UE to perform uplink and/or downlink data communication with one or more base stations using a carrier-aggregation scheme.

Means for performing the function at block 1302 can include, for example, processing unit(s) 910, bus 905, memory 960, wireless communication interface 930, and/or other components of a UE 120 as illustrated in FIG. 9, as well as controller/processor 1080 of FIG. 10. For example, the UE may obtain information about the set of candidate carriers from the set of carriers that are tuned to by the transceivers of wireless communication interface 930 for downlink data reception and/or uplink data transmission.

At block 1304, the UE may determine whether there is at least one candidate carrier not associated with any cross-carrier scheduling (CCS) group. The determination can be based on, for example, table 800 of FIG. 8.

Means for performing the function at block 1304 can include, for example, processing unit(s) 910, bus 905, memory 960, and/or other components of a UE 120 as illustrated in FIG. 9, as well as controller/processor 1080 of FIG. 10. For example, processing unit(s) 910 may access table 800 of FIG. 8 stored in memory 960 via bus 905 to obtain the CCS group information, and determine whether there is at least one candidate carrier not associated with any CCS group based on the information.

If there is at least one such candidate carrier (at block 1306), the UE may proceed to block 1308 and determine a carrier that is associated with the lowest data throughput among the at least one candidate carrier, to avoid selecting a parent carrier of a CCS group for tune away. As discussed above, the parent carrier carries cross-carrier scheduling information (e.g., DCI) for other carriers, and using the parent carrier for tune away may affect the wireless data communication not just of the parent carrier but also for all other carriers of the CCS group, which further exacerbate the degradation of data throughput by the tune away process. The UE can then proceed to block 1310 and select the determined carrier for tune away.

On the other hand, if the UE determines that all of the candidate carriers are associated with CCS groups (at block 1306), the UE may proceed to block 1312 to determine the CCS groups associated with each of the candidate carriers (e.g., based on table 800 of FIG. 8). The UE can then proceed to block 1314 to determine a CCS group with the lowest accumulative throughput among the CCS groups. The UE can then proceed to block 1316 to determine a parent carrier of the CCS group determined in block 1314. As discussed above, the parent carrier may be the carrier scheduled to carry the cross-scheduling control data and provide the control data to the UE. The UE can then exclude the parent carrier from consideration for tune away (at block 1318), and proceed to blocks 1308 and 1310 to select the carrier for tune away.

Means for performing the functions at blocks 1306-1316 can include, for example, processing unit(s) 910, bus 905, memory 960, and/or other components of a UE 120 as illustrated in FIG. 9, as well as controller/processor 1080 of FIG. 10.

Figure 13B:
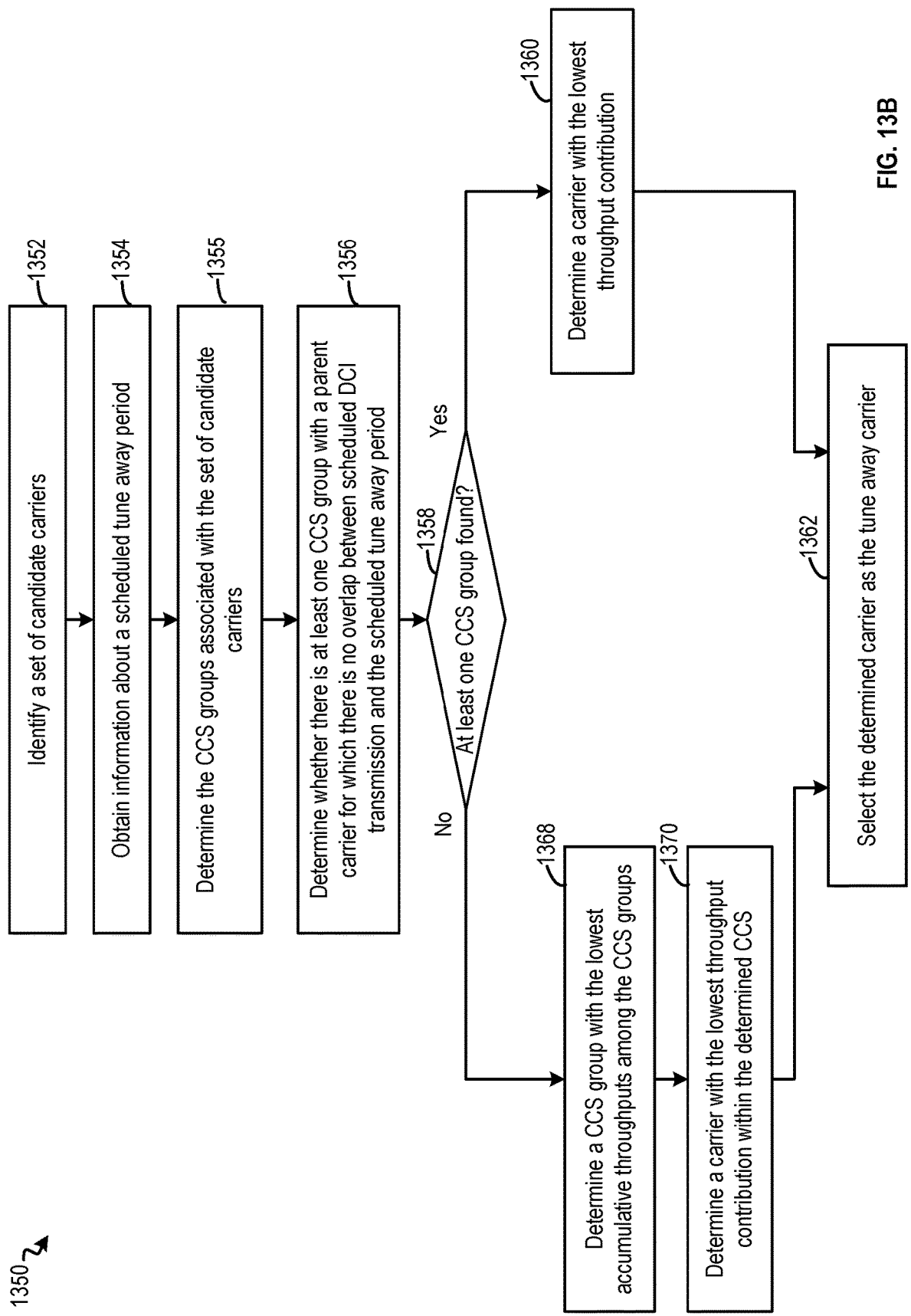

FIG. 13B shows a process 1350 for performing wireless communication. Process 1350 may also be performed by a UE (e.g., UE 120) operating in a wireless communication network associated with, for example, 5G New Radio. At block 1352, the UE may identify a set of candidate carriers. The set of candidate carriers may include the carriers used by the UE to perform uplink and/or downlink data communication with one or more base stations using a carrier-aggregation scheme.

Means for performing the function at block 1352 can include, for example, processing unit(s) 910, bus 905, memory 960, wireless communication interface 930, and/or other components of a UE 120 as illustrated in FIG. 9, as well as controller/processor 1080 of FIG. 10. For example, the UE may obtain information about the set of candidate carriers from the set of carriers that are tuned to by the transceivers of wireless communication interface 930 for downlink data reception and/or uplink data transmission.

At block 1354, the UE may obtain timing information related to one or more pre-scheduled tune away periods for receiving wireless position measurement signals (e.g., PRS). The timing information may be obtained from, for example, Assistance Data from a location server.

Means for performing the function at block 1354 can include, for example, processing unit(s) 910, wireless communication interface 930, bus 905, memory 960, and/or other components of a UE 120 as illustrated in FIG. 9, as well as controller/processor 1080 of FIG. 10. For example, processing unit(s) 910 may receive the timing information from a location server via wireless communication interface 930.

At block 1355, the UE may determine the cross-carrier scheduling (CCS) groups associated with the set of candidate carriers. The determination can be based on, for example, table 800 of FIG. 8.

Means for performing the function at block 1355 can include, for example, processing unit(s) 910, bus 905, memory 960, and/or other components of a UE 120 as illustrated in FIG. 9, as well as controller/processor 1080 of FIG. 10. For example, processing unit(s) 910 may access table 800 of FIG. 8 stored in memory 960 via bus 905 to obtain the CCS group information, and determine the CCS groups associated with the set of candidate carriers.

At block 1356, the UE may determine whether there is at least one CCS group with a parent carrier for which there is no overlap between scheduled DCI transmissions and the scheduled tune away periods. The determination can be based on, for example, the subframes for the scheduled DCI transmission timing information included in table 800 of FIG. 8, and the subframes for the scheduled tune away period.

If there is at least one CCS group with a parent carrier for which there is no overlap between scheduled DCI transmission and the scheduled tune away (at block 1358), the UE may determine a carrier that is associated with the lowest data throughput within the at least one CCS group, at block 1360. The UE can then proceed to block 1362 and select the determined carrier for tune away.

On the other hand, if the UE determines that all of the CCS groups have parent carriers for which there is overlap between the scheduled DCI transmissions and the scheduled tune away periods (at block 1358), the UE may proceed to block 1368 to identify a CCS group with the lowest accumulative throughput among the CCS groups. The UE can then proceed to block 1370 to select a carrier for tune away from the CCS group based on different criteria including, for example, the carrier being associated with a lowest throughput, the carrier being not a parent carrier that carries the DCI, etc.). The UE can then proceed to block 1362 to select the determined carrier for tune away.

Means for performing the functions blocks 1354-1362 can include, for example, processing unit(s) 910, bus 905, memory 960, and/or other components of a UE 120 as illustrated in FIG. 9, as well as controller/processor 1080 of FIG. 10.

Figure 14:
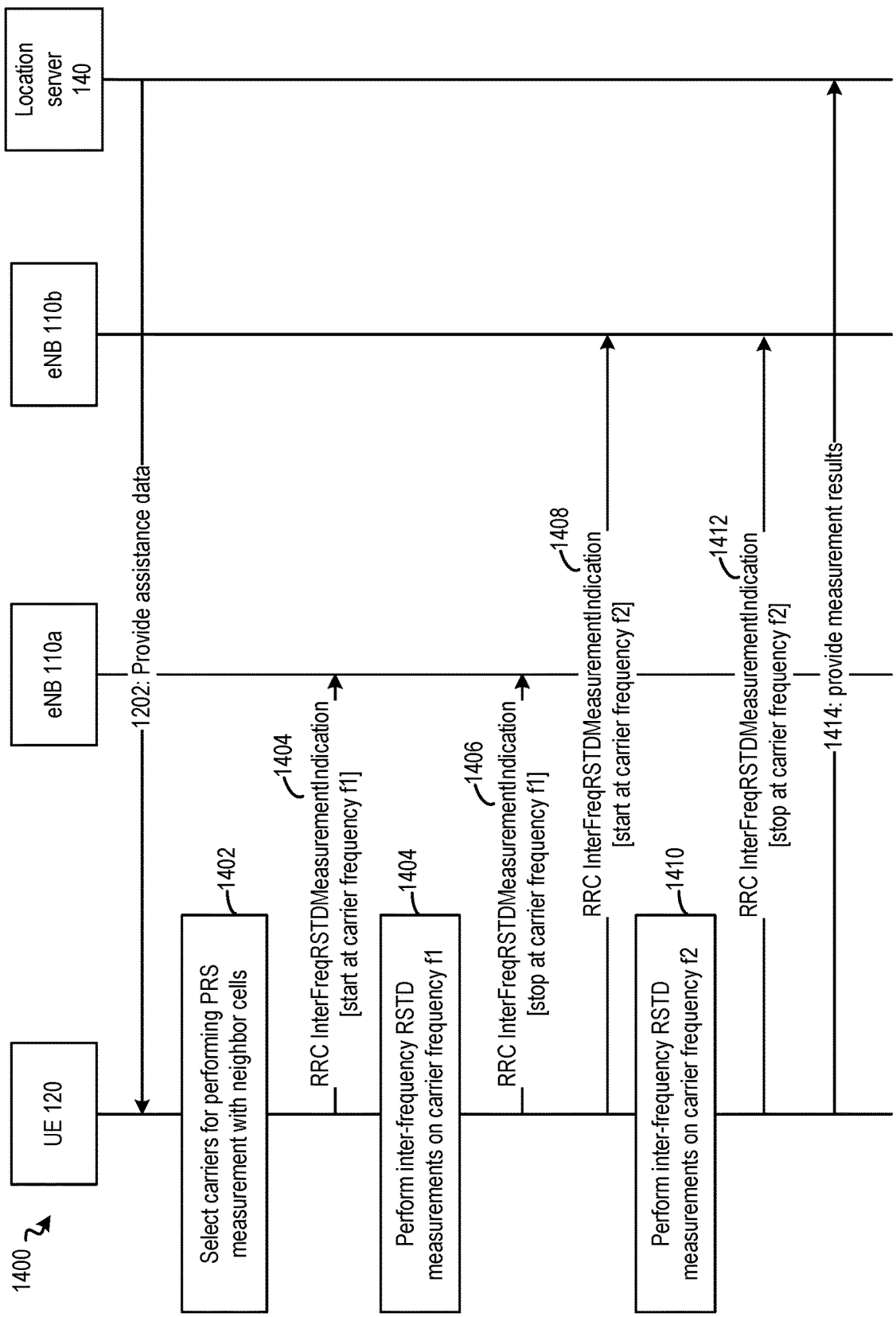

FIG. 14 shows a process 1400 for performing wireless communication. Process 1400 can be performed by UE 120, eNBs 110*a* and 110*b*, and location server 140 of FIG. 1. At 1402, the location server provides assistance data to UE 120, which includes information of carriers provided by neighboring cells to carry PRS signals for positional measurement, as well as the scheduled transmission of the PRS signals. At 1404, UE 120 can select the carriers for performing the PRS measurements, and determine the tune away periods for these PRS measurements. At 1406, UE 120 sends an RRC (Radio Resource Control) InterFrequRSTD-MeasurementIndication message to eNB 110*a* to start performing inter-frequency RSTD measurement at carrier frequency band f1. The transmission of the message is with a carrier frequency band f1. The eNB 110*a* may schedule the transmission of the PRS signal using carrier frequency band f1 and perform RRC connection configuration (not shown in FIG. 14). At the scheduled tune away time, UE 120 can perform inter-frequency RSTD measurements on carrier frequency f1, at block 1406. As part of the inter-frequency RSTD measurement at block 1404, UE 120 may select one of the carriers that are currently used for data transmission for tune away to carrier frequency f1. The selection of the carrier can be based on the aforementioned techniques. After the measurement is complete, UE 120 may proceed to block 1406 to transmit an RRC InterFrequRSTDMeasurementIndication message to eNB 110*a*, to stop the inter-frequency RSTD measurement at carrier frequency band f1.

UE 120 then proceeds to block 1408 to transmit an RRC InterFrequRSTDMeasurementIndication message to eNB 110*b* to start performing inter-frequency RSTD measurement at carrier frequency band f2. The transmission of the message is with a carrier frequency band f2. The eNB 110*b* may schedule the transmission of the PRS signal using carrier frequency band f2 and perform RRC connection configuration (not shown in FIG. 15). At the scheduled tune away time, UE 120 can perform inter-frequency RSTD measurements on carrier frequency f2, at block 1410. As part of the inter-frequency RSTD measurement at block 1410, UE 120 may also select one of the carriers that are currently used for data transmission for tune away to carrier frequency f1. The selection of the carrier is based on the aforementioned techniques. After the measurement is complete, UE 120 may proceed to block 1412 to transmit a RRC InterFrequRSTDMeasurementIndication message to eNB 110*b*, to stop the inter-frequency RSTD measurement at carrier frequency band f2. Although not shown in FIG. 14, it is understood that UE 120 may perform another inter-frequency RSTD measurement with another eNB. After the RSTD measurements are complete, UE 120 can proceed to block 1414 to transmit the RSTD measurement results to location server 140, which then performs a location estimate of UE 120 based on the RSTD measurement results and the location information of the eNBs that participate in the RSTD measurements.

Figure 15:
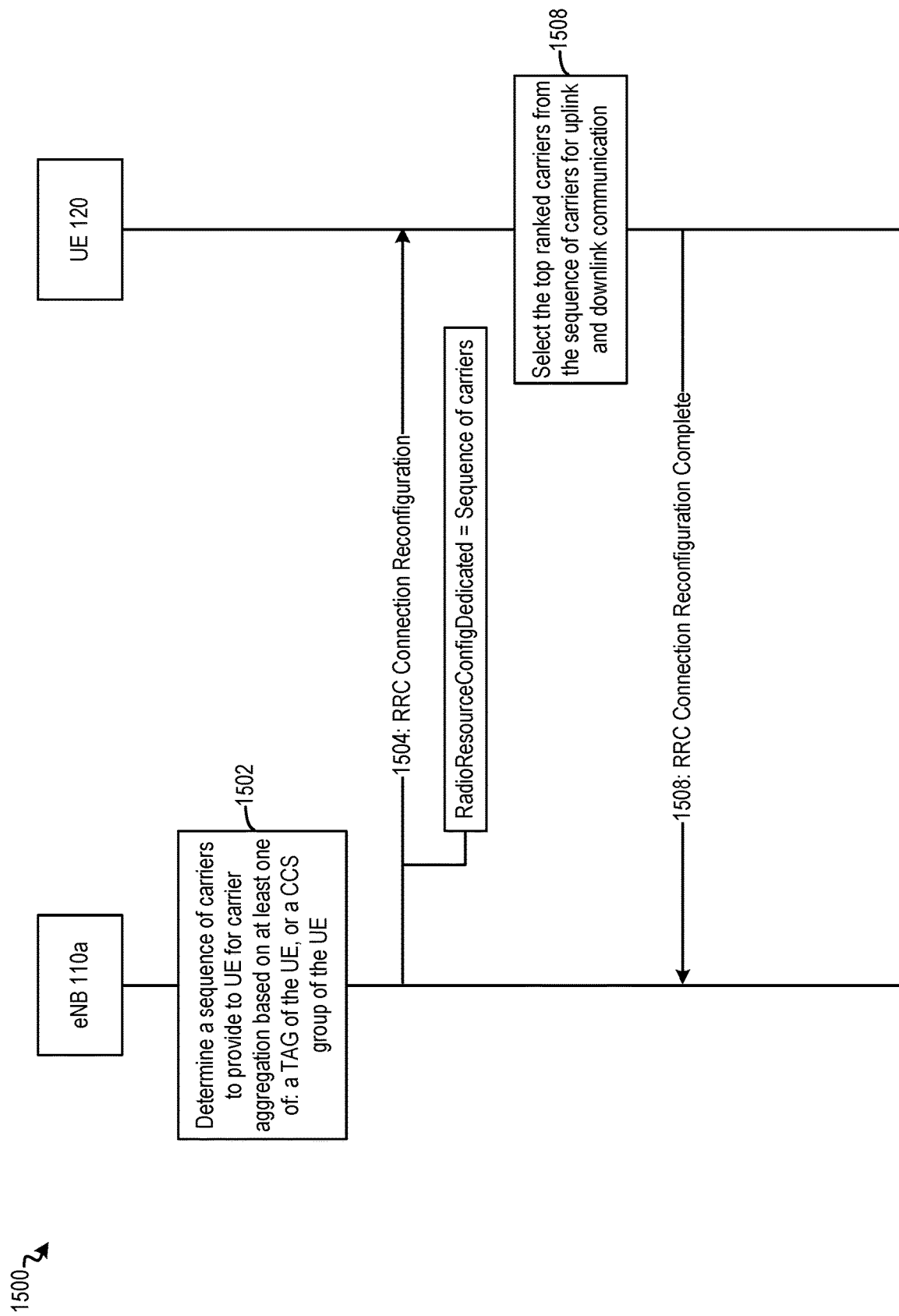

FIG. 15 shows a process 1500 for performing wireless communication. Process 1300 can be performed by UE 120 and eNB 110*a* of FIG. 1. At block 1502, eNB 110*a* can determine a set of carriers to provide to UE 120 for carrier aggregation based on at least one of: a TAG of the UE, or a CCS group of the UE. For example, as discussed above, under the carrier aggregation scheme a number of base stations may provide a set of component frequencies to a UE. Based on the locations of the base stations, as well as the estimated propagation time between the UE and the base stations, the base stations can estimate which of the carriers are grouped under a particular TAG at the UE. The base stations can then select a carrier (and a base station to provide that carrier), and provide that carrier to the UE for carrier aggregation, with the assumption that this carrier will not be part of the TAG. As another example, a base station may also provide a carrier that is not associated with any CCS group to the UE for carrier aggregation. In both cases, the carrier can be preferably selected by the UE for tune away over, for example, a carrier associated with a TAG or a CCS group. At block 1502, eNB 110*a* may also rank the set of carriers, so that the carriers not associated with TAG or CCS are ranked at the top. Associating these carriers with higher ranking increases the likelihood that these carriers will be selected by UE 120 for carrier aggregation.

At block 1504, eNB 110*a* may perform RRC connection reconfiguration with UE 120. As part of the reconfiguration, eNB 110*a* may include the list of ranked carriers to UE 120 in the RadioResourceConfigDedicated message, and transmit the message to UE 120 during the reconfiguration. UE 120 may then proceed to block 1506 to select the top ranked carriers from the message, and complete RRC reconfiguration at block 1508.

According to another example, an apparatus for wireless communication is provided. The apparatus may comprise: means for identifying a set of candidate carriers, wherein the set of candidate carriers are associated with at least one of: downlink data reception, uplink data transmission, or any combination thereof; means for obtaining first timing information relating to one or more pre-scheduled tune away periods for receiving wireless position measurement signals; means for obtaining second timing information relating to pre-scheduled downlink data reception for each candidate carrier of the set of candidate carriers; means for selecting, from the set of candidate carriers, a carrier based on the first timing information and the second timing information; and means for during the one or more pre-scheduled periods for receiving wireless position measurement signals, controlling a wireless communication interface to: tune away from the tune away carrier to suspend downlink data reception or uplink data transmission using the tune away carrier, and tune to another carrier to receive the wireless position measurement signals.

In some aspects, the second timing information includes a pre-scheduled timing window for receiving a timing advance command for each carrier of the set of candidate carriers. The apparatus may further comprise: means for determining, from the set of candidate carriers, whether there is at least one carrier for which there is no overlap between the pre-scheduled timing window and the one or more pre-scheduled tune away periods; and means for responsive to determining that there is at least one carrier for which there is no overlap between the pre-scheduled timing window and the one or more pre-scheduled tune away periods, selecting the carrier from the at least one carrier.

In some aspects, the pre-scheduled timing window is determined based on a time alignment timer. The tune away carrier can be selected based on having a lowest throughput among the at least one carrier.

In some aspects, the second timing information includes a pre-scheduled timing window for receiving a timing advance command for each carrier of the set of candidate carriers. The apparatus may further include: means for responsive to determining that each carrier of the set of candidate carriers has an overlap between the pre-scheduled timing window of the each carrier and the one or more pre-scheduled tune away periods, selecting the carrier based on determining whether each carrier of the set of candidate carriers is associated with one or more timing advance groups (TAGs).

In some aspects, the apparatus further includes means for: responsive to determining that at least one carrier is not associated with the one or more TAGs, selecting the carrier from the at least one carrier. The tune away carrier may be selected based on a lowest throughput among the at least one carrier.

In some aspects, the apparatus further includes means for responsive to determining that each carrier of the set of candidate carriers is associated with the one or more TAGs: determining a throughput for each TAG of the one or more TAGs based on accumulative throughputs of a subset of candidate carriers associated with the each TAG; determining, from the one or more TAGs, a first TAG associated with a lowest throughput among the one or more TAGs; and selecting the tune away carrier from the subset of candidate carriers associated with the first TAG. The tune away carrier may selected based on having a lowest throughput among the subset of candidate carriers associated with the first TAG.

In some aspects, the apparatus may further include means for transmitting a request for measurement gaps for receiving the wireless positional measurement signals using a second carrier; and means for at a scheduled tune away period associated with the second carrier, controlling the wireless communication interface to tune away from the tune away carrier to the second carrier to receive the wireless position measurement signals.

According to another example, an apparatus for wireless communication is provided. The apparatus may comprise: means for identifying a set of candidate carriers, wherein the set of candidate carriers are associated with at least one of: downlink data reception, uplink data transmission, or any combination thereof; means for determining whether the set of candidate carriers are associated with one or more cross-carrier scheduling (CCS) groups; means for selecting, from the set of candidate carriers, a carrier for tune away based on whether the carrier is associated with the one or more CCS groups; and means for during one or more pre-scheduled tune away periods for receiving wireless position measurement signals, controlling a wireless communication interface to: tune away from the tune away carrier to suspend downlink data reception or uplink data transmission using the tune away carrier, and tune to another carrier to receive the wireless position measurement signals.

In some aspects, the apparatus may include means for: based on a determination that each carrier of the set of candidate carriers is associated with the one or more CCS groups: determining a throughput for each CCS group of the one or more CCS groups based on accumulative throughputs of a subset of candidate carriers associated with the each CCS group; selecting, from the one or more CCS groups, a first CCS group associated with a lowest throughput among the one or more CCS groups; and selecting the carrier from the subset of candidate carriers associated with the first CCS group. The tune away carrier may selected based on having a lowest throughput among the subset of candidate carriers associated with the first CCS group.

In some aspects, the apparatus may include means for: obtaining first timing information relating to one or more first pre-scheduled periods for receiving wireless position measurement signals; obtaining second timing information relating to one or more second pre-scheduled periods for transmission of downlink control information (DCI) including cross-carrier scheduling information for a parent carrier among the candidate carriers associated with the first CCS group; and based on a determination that there is an overlap between the one or more first pre-scheduled periods and the one or more second pre-scheduled periods, excluding the parent carrier from the subset of candidate carriers associated with the first CCS group being considered to be the tune away carrier.

In some aspects, the apparatus may include means for: based on a determination that at least one carrier of the set of candidate carriers is not associated with the one or more CCS groups, selecting the carrier for tune away from the at least one carrier. The tune away carrier can be selected based on having a lowest throughput among the at least one carrier.

According to another example, a non-transitory computer-readable medium is provided. The computer-readable medium may store a set of instructions which, when executed by one or more hardware processors coupled with a wireless communication interface, causes the one or more hardware processors to perform any of the disclosed methods and processes. In one example, the one or more hardware processors may perform: identifying a set of candidate carriers, wherein the set of candidate carriers are associated with at least one of: downlink data reception, uplink data transmission, or any combination thereof; obtaining first timing information relating to one or more pre-scheduled tune away periods for receiving wireless position measurement signals; obtaining second timing information relating to pre-scheduled downlink data reception or pre-scheduled uplink data transmission for each candidate carrier of the set of candidate carriers; selecting, from the set of candidate carriers, a carrier for tune away based on the first timing information and the second timing information; and during the one or more pre-scheduled tune away periods, controlling the wireless communication interface to: tune away from the tune away carrier to suspend downlink data reception or uplink data transmission using the tune away carrier, and tune to another carrier to receive the wireless position measurement signals.

In another example, the computer-readable medium may store a set of instructions which, when executed by one or more hardware processors coupled with a wireless communication interface, causes the one or more hardware processors to perform: identifying a set of candidate carriers, wherein the set of candidate carriers are associated with at least one of: downlink data reception, uplink data transmission, or any combination thereof; determining whether the set of candidate carriers are associated with one or more cross-carrier scheduling (CCS) groups; selecting, from the set of candidate carriers, a carrier for tune away based on whether the carrier is associated with the one or more CCS groups; and during one or more pre-scheduled tune away periods for receiving wireless position measurement signals, controlling a wireless communication interface to: tune away from the tune away carrier to suspend downlink data reception or uplink data transmission using the tune away carrier, and tune to another carrier to receive the wireless position measurement signals.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as hardware, software/firmware, or combinations thereof. To clearly illustrate this interchangeability of hardware and software/firmware, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination of the two. A software/firmware module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, the method comprising:
   identifying a set of candidate carriers, wherein the set of candidate carriers are associated with at least one of: downlink data reception, uplink data transmission, or any combination thereof;
   selecting, from the set of candidate carriers, a tune away carrier based on a throughput of a cross-carrier scheduling (CCS) group associated with the tune away carrier, wherein selecting, from the set of candidate carriers, a tune away carrier based on a throughput of a cross-carrier scheduling group associated with the tune away carrier comprises:
      determining an accumulative throughput for each CCS group of one or more CCS groups based on accumulative throughputs of a subset of candidate carriers associated with each respective CCS group;
      selecting, from the one or more CCS groups, a first CCS group associated with a lowest accumulative throughput among the one or more CCS groups; and
      selecting the tune away carrier from the subset of candidate carriers associated with the first CCS group based on the tune away carrier having a lowest throughput among the subset of candidate carriers associated with the first CCS group; and
   during one or more pre-scheduled tune away periods for receiving wireless position measurement signals, controlling a wireless communication interface to:
      tune away from the tune away carrier to suspend downlink data reception or uplink data transmission using the tune away carrier, and
      tune to another carrier to receive the wireless position measurement signals.

2. The method of claim 1, wherein selecting the tune away carrier from the subset of candidate carriers associated with the first CCS group comprises:
   obtaining first timing information relating to one or more first pre-scheduled periods for receiving wireless position measurement signals;
   obtaining second timing information relating to one or more second pre-scheduled periods for transmission of downlink control information (DCI) including cross-carrier scheduling information for a parent carrier among the subset of candidate carriers associated with the first CCS group; and
   selecting the tune away carrier based on whether there is an overlap between the one or more first pre-scheduled periods and the one or more second pre-scheduled periods.

3. The method of claim 2, wherein the first timing information and the second timing information are represented based on subframe positions in the uplink data transmission or the downlink data reception.

4. The method of claim 2, wherein selecting the tune away carrier from the subset of candidate carriers associated with the first CCS group comprises:
   based on a determination that there is an overlap between the one or more first pre-scheduled periods and the one or more second pre-scheduled periods, excluding the parent carrier from the subset of candidate carriers associated with the first CCS group being considered to be the tune away carrier.

5. The method of claim 2, wherein selecting the tune away carrier from the subset of candidate carriers associated with the first CCS group comprises:
   based on a determination that there is no overlap between the one or more first pre-scheduled periods and one or more pre-scheduled periods for transmission of DCI of a parent carrier of at least one CCS group of the one or more CCS groups, selecting a carrier that provides a lowest accumulative throughput among carriers in the at least one CCS group as the tune away carrier.

6. The method of claim 2, wherein selecting the tune away carrier from the subset of candidate carriers associated with the first CCS group comprises:
   based on a determination that there is an overlap between the one or more first pre-scheduled periods and one or more pre-scheduled periods for transmission of DCI of a parent carrier of each of the one or more CCS groups, selecting the first CCS group based on the first CCS group having a lowest accumulative throughput among the one or more CCS groups.

7. The method of claim 1, wherein the tune away carrier is a first tune away carrier; and
   wherein the method further comprises:
      determining that at least one carrier of the set of candidate carriers is not associated with the one or more CCS groups; and
      selecting a second tune away carrier from the determined at least one carrier based on the second tune away carrier having a lowest throughput among the determined at least one carrier.

8. The method of claim 1, further comprising:
   transmitting a request for measurement gaps for receiving the wireless positional measurement signals using a second carrier; and
   at a scheduled tune away period associated with the second carrier, controlling the wireless communication interface to tune away from the tune away carrier to the second carrier to receive the wireless position measurement signals.

9. A user equipment (UE), comprising:
   a wireless communication interface;
   a memory; and
   a processing unit communicatively coupled with the memory and the wireless communication interface and configured to cause the UE to:
      identify a set of candidate carriers, wherein the set of candidate carriers are associated with at least one of: downlink data reception, uplink data transmission, or any combination thereof;
      select, from the set of candidate carriers, a tune away carrier based on a throughput of a cross-carrier scheduling (CCS) group associated with the tune away carrier, wherein the processing unit configured to cause the UE to select, from the set of candidate carriers, a tune away carrier based on a throughput of a cross-carrier scheduling group associated with the tune away carrier comprises the processing unit configured to cause the UE to:
         determine an accumulative throughput for each CCS group of one or more CCS groups based on accumulative throughputs of a subset of candidate carriers associated with each respective CCS group;
         select, from the one or more CCS groups, a first CCS group associated with a lowest accumulative throughput among the one or more CCS groups; and
         select the tune away carrier from the subset of candidate carriers associated with the first CCS group based on the tune away carrier having a lowest throughput among the subset of candidate carriers associated with the first CCS group; and during one or more pre-scheduled tune away periods for receiving wireless position measurement signals, control the wireless communication interface to:

tune away from the tune away carrier to suspend downlink data reception or uplink data transmission using the tune away carrier, and tune to another carrier to receive the wireless position measurement signals.

10. The UE of claim 9, wherein the processing unit is further configured to cause the UE to:

obtain first timing information relating to one or more first pre-scheduled periods for receiving wireless position measurement signals;

obtain second timing information relating to one or more second pre-scheduled periods for transmission of downlink control information (DCI) including cross-carrier scheduling information for a parent carrier among the subset of candidate carriers associated with the first CCS group; and select the tune away carrier based on whether there is an overlap between the one or more first pre-scheduled periods and the one or more second pre-scheduled periods.

11. The UE of claim 10, wherein the first timing information and the second timing information are represented based on subframe positions in the uplink data transmission or the downlink data reception.

12. The UE of claim 10, wherein the processing unit is further configured to cause the UE to:

based on a determination that there is an overlap between the one or more first pre-scheduled periods and the one or more second pre-scheduled periods, exclude the parent carrier from the subset of candidate carriers associated with the first CCS group being considered to be the tune away carrier.

13. The UE of claim 10, wherein the processing unit is further configured to cause the UE to:

based on a determination that there is no overlap between the one or more first pre-scheduled periods and one or more pre-scheduled periods for transmission of DCI of a parent carrier of at least one CCS group of the one or more CCS groups, select a carrier that provides a lowest accumulative throughput among carriers in the at least one CCS group as the tune away carrier.

14. The UE of claim 10, wherein the processing unit is further configured to cause the UE to:

based on a determination that there is an overlap between the one or more first pre-scheduled periods and one or more pre-scheduled periods for transmission of DCI of a parent carrier of each of the one or more CCS groups, select the first CCS group based on the first CCS group having a lowest accumulative throughput among the one or more CCS groups.

15. The UE of claim 9, wherein the tune away carrier is a first tune away carrier;

wherein the processing unit is further configured to cause the UE to:

determine that at least one carrier of the set of candidate carriers is not associated with the one or more CCS groups, and select a second tune away carrier from the determined at least one carrier based on the second tune away carrier having a lowest throughput among the determined at least one carrier.

16. The UE of claim 9, wherein the processing unit is further configured to cause the UE to:

transmit a request for measurement gaps for receiving the wireless positional measurement signals using a second carrier; and during a scheduled tune away period associated with the second carrier, control the wireless communication interface to tune away from the tune away carrier to the second carrier to receive the wireless position measurement signals.

17. A non-transitory computer readable medium storing instructions that, when executed by a processor of a user equipment (UE), causes the UE to:

identify a set of candidate carriers, wherein the set of candidate carriers are associated with at least one of: downlink data reception, uplink data transmission, or any combination thereof;

select, from the set of candidate carriers, a tune away carrier based on a throughput of a cross-carrier scheduling (CCS) group associated with the tune away carrier, wherein the instructions to select, from the set of candidate carriers, a tune away carrier based on a throughput of a cross-carrier scheduling (CCS) group associated with the tune away carrier comprise instructions to:

determine an accumulative throughput for each CCS group of one or more CCS groups based on accumulative throughputs of a subset of candidate carriers associated with each respective CCS group;

select, from the one or more CCS groups, a first CCS group associated with a lowest accumulative throughput among the one or more CCS groups; and select the tune away carrier from the subset of candidate carriers associated with the first CCS group based on the tune away carrier having a lowest throughput among the subset of candidate carriers associated with the first CCS group; and during one or more pre-scheduled tune away periods for receiving wireless position measurement signals, control a wireless communication interface of the UE to:

tune away from the tune away carrier to suspend downlink data reception or uplink data transmission using the tune away carrier, and tune to another carrier to receive the wireless position measurement signals.

18. The non-transitory computer readable medium of claim 17, further storing instructions that, when executed by the processor of the UE, causes the UE to:

obtain first timing information relating to one or more first pre-scheduled periods for receiving wireless position measurement signals; and obtain second timing information relating to one or more second pre-scheduled periods for transmission of downlink control information (DCI) including cross-carrier scheduling information for a parent carrier among the subset of candidate carriers associated with the first CCS group.

19. The non-transitory computer readable medium of claim 18, wherein the first timing information and the second timing information are represented based on subframe positions in the uplink data transmission or the downlink data reception.

20. The non-transitory computer readable medium of claim 18, further storing instructions that, when executed by the processor of the UE, causes the UE to:

based on a determination that there is an overlap between the one or more first pre-scheduled periods and the one or more second pre-scheduled periods, exclude the parent carrier from the subset of candidate carriers associated with the first CCS group being considered to be the tune away carrier.

21. The non-transitory computer readable medium of claim 18, further storing instructions that, when executed by the processor of the UE, causes the UE to: based on a determination that there is no overlap between the one or more first pre-scheduled periods and one or more pre-scheduled periods for transmission of DCI of a parent carrier of at least one CCS group of the one or more CCS groups, select a carrier that provides a lowest accumulative throughput among carriers in the at least one CCS group as the tune away carrier.

22. The non-transitory computer readable medium of claim 18, further storing instructions that, when executed by the processor of the UE, causes the UE to:
based on a determination that there is an overlap between the one or more first pre-scheduled periods and one or more pre-scheduled periods for transmission of DCI of a parent carrier of each of the one or more CCS groups, select the first CCS group based on the first CCS group having a lowest accumulative throughput among the one or more CCS groups.

23. The non-transitory computer readable medium of claim 17, wherein the tune away carrier is a first tune away carrier; and
wherein the non-transitory computer readable medium further stores instructions that, when executed by the processor of the UE, causes the UE to:
determine that at least one carrier of the set of candidate carriers is not associated with the one or more CCS groups, and
select a second tune away carrier from the determined at least one carrier based on the second tune away carrier having a lowest throughput among the determined at least one carrier.

24. An apparatus, comprising:
means for identifying a set of candidate carriers, wherein the set of candidate carriers are associated with at least one of: downlink data reception, uplink data transmission, or any combination thereof;
means for selecting, from the set of candidate carriers, a tune away carrier based on a throughput of a cross-carrier scheduling (CCS) group associated with the tune away carrier wherein the means for selecting, from the set of candidate carriers, a tune away carrier based on a throughput of a CCS group associated with the tune away carrier comprises:
means for determining an accumulative throughput for each CCS group of one or more CCS groups based on accumulative throughputs of a subset of candidate carriers associated with each respective CCS group;
means for selecting, from the one or more CCS groups, a first CCS group associated with a lowest accumulative throughput among the one or more CCS groups; and
means for selecting the tune away carrier from the subset of candidate carriers associated with the first CCS group based on the tune away carrier having a lowest throughput among the subset of candidate carriers associated with the first CCS group; and
means for during one or more pre-scheduled tune away periods for receiving wireless position measurement signals, controlling a wireless communication interface to:
tune away from the tune away carrier to suspend downlink data reception or uplink data transmission using the tune away carrier, and
tune to another carrier to receive the wireless position measurement signals.

25. The apparatus of claim 24, further comprising:
means for obtaining first timing information relating to one or more first pre-scheduled periods for receiving wireless position measurement signals;
means for obtaining second timing information relating to one or more second pre-scheduled periods for transmission of downlink control information (DCI) including cross-carrier scheduling information for a parent carrier among the subset of candidate carriers associated with the first CCS group; and
means for determining the tune way carrier based on whether there is overlap between the one or more first pre-scheduled periods and the one or more second pre-scheduled periods.

26. The apparatus of claim 24, wherein the tune away carrier is a first tune away carrier; and
wherein the apparatus further comprises:
means for determining that at least one carrier of the set of candidate carriers is not associated with the one or more CCS groups; and
means for selecting a second tune away carrier from the determined at least one carrier based on the tune away carrier having a lowest throughput among the determined at least one carrier.

* * * * *